US008675736B2

(12) United States Patent
Huang et al.

(10) Patent No.: US 8,675,736 B2
(45) Date of Patent: Mar. 18, 2014

(54) MOTION VECTOR PROCESSING

(75) Inventors: Ai-Mei Huang, Taichung (TW);
Chia-yuan Teng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 793 days.

(21) Appl. No.: 12/779,243

(22) Filed: May 13, 2010

(65) Prior Publication Data
US 2010/0290530 A1 Nov. 18, 2010

Related U.S. Application Data

(60) Provisional application No. 61/178,185, filed on May 14, 2009.

(51) Int. Cl.
*H04B 1/66* (2006.01)
(52) U.S. Cl.
USPC ............ 375/240.16; 375/240.15; 375/240.14; 375/240.12; 382/238; 382/236; 348/699
(58) Field of Classification Search
USPC ............. 375/240.16, 240.15, 240.14, 240.12; 382/238, 236, 699; 348/699
See application file for complete search history.

(56) References Cited

U.S. PATENT DOCUMENTS

| 5,576,767 | A * | 11/1996 | Lee et al. ................. 375/240.14 |
| 6,473,460 | B1 * | 10/2002 | Topper ..................... 375/240.16 |
| 7,606,313 | B2 * | 10/2009 | Raman et al. ............. 375/240.27 |
| 8,155,213 | B2 * | 4/2012 | Huang et al. ............. 375/240.27 |
| 2006/0017843 | A1 * | 1/2006 | Shi et al. ........................ 348/441 |
| 2008/0025403 | A1 | 1/2008 | Sato et al. |

FOREIGN PATENT DOCUMENTS

| CN | 1585487 | * | 2/2005 | ............... H04N 7/32 |
| EP | 1 885 129 A2 | * | 2/2008 | ............... H04N 7/01 |
| EP | 1885129 | | 2/2008 | |
| WO | WO2009032255 | | 3/2009 | |

OTHER PUBLICATIONS

Kuo Y., et al., "Temporal Error Concealment for H.264 Using Optimum Regression Plane", MMM 2008, LNCS 4903, pp. 402-412, 2008.
Taiwan Search Report—TW099115597—TIPO—May 2, 2013.
Al-ME1 Huang, et al., "A Multistage Motion Vector Processing Method for Motion-Compensated Frame Interpolation" IEEE Transactions on Image Processing, IEEE Service Center, Piscataway, NJ, US LNKD-DO1 : 10.1109/TIP. 2008.919360, vol. 15, No. 5, May 1, 2008, pp. 694-708, XP011225973 ISSN: 1057-7149.

(Continued)

*Primary Examiner* — Shawn An
(74) *Attorney, Agent, or Firm* — John Rickenbrode; Brent Boyd

(57) ABSTRACT

This disclosure describes techniques for processing motion vectors such that the resulting motion vectors better correlate with the true motion of a video frame. In one example, the techniques may include comparing a block motion vector corresponding to a video block to a sub-block motion vector corresponding to a sub-block contained within the video block. The techniques may further include selecting one of the block motion vector and the sub-block motion vector as a spatially-estimated motion vector for the sub-block based on the comparison. Motion vectors that better correlate with true motion may be useful in applications such as motion compensated frame interpolation (MCI), moving object tracking, error concealment, or other video post-processing that requires the true motion information.

38 Claims, 20 Drawing Sheets

(56) References Cited

OTHER PUBLICATIONS

Al-ME1 Huang, et al., "Correlation-Based Motion Vector Processing With Adaptive Interpolation Scheme for Motion-Compensated Frame Interpolation" IEEE Transactions on Image Processing, IEEE Service Center, Piscataway, NJ, US, vol. 17, No. 4, Apr. 1, 2009, pp. 740-752, XP011253325 ISSN: 1057-7149.

Fujiwara S, et al., "Motion-Compensated Frame Rate Up-Conversion Based on Block Matching Algorithm with Multi-Size Blocks" Proceedings of 2005 International Symposium on Intelligent Signal Processing and Communication Systems. Piscataway, NJ, USA, Dec. 13, 2005, pp. 353-356, XP010894609 ISBN: 978-0-7803-9266-3.
International Search Report and Written Opinion—PCT/US2010/034890, International Search Authority—European Patent Office—Oct. 21, 2010.

* cited by examiner

MOTION VECTOR PROCESSING

This Application claims the benefit of U.S. Provisional Application No. 61/178,185 filed on May 14, 2009, the entire content of which is incorporated herein by reference.

TECHNICAL FIELD

This disclosure relates to block-based digital video processing and, more particularly, to techniques for processing motion vectors.

BACKGROUND

Many different video coding techniques have been developed for encoding and decoding of digital video sequences. The Moving Picture Experts Group (MPEG), for example, has developed several encoding standards including MPEG-1, MPEG-2 and MPEG-4. Other example coding techniques include those set forth in the standards developed by the International Telecommunication Union (ITU), such as the ITU-T H.263 standard, and the ITU-T H.264 standard and its counterpart, ISO/IEC MPEG-4, Part 10, i.e., Advanced Video Coding (AVC). These and other video coding techniques support efficient transmission of video sequences by encoding data in a compressed manner.

Video compression may involve spatial and/or temporal prediction to reduce redundancy inherent in a video sequence. In other words, video compression attempts to reduce the amount of data that needs to be transmitted between devices in order to communicate a given video sequence. Intra-coding uses spatial prediction to reduce spatial redundancy of video blocks within the same video frame. Inter-coding uses temporal prediction to reduce temporal redundancy between video blocks in successive video frames. For inter-coding, a video encoder performs motion estimation to generate motion vectors indicating displacement of video blocks relative to corresponding prediction video blocks in one or more reference frames. The video encoder performs motion compensation to generate a prediction video block from the reference frame, and forms a residual video block by subtracting the prediction video block from the original video block being coded.

Frame skipping may also be implemented by encoding devices and decoding devices to reduce the amount of data that needs to be transmitted between devices. In general, frame skipping refers to techniques in which the processing, encoding, decoding, transmission, or display of one or more frames is purposely avoided at the encoder or at the decoder. For example, instead of compressing and sending each frame in a 30 frames per second (fps) bit-stream, every other frame may be skipped during the encoding process resulting in a temporal resolution of 15 fps. Although frame skipping may effectively improve transmission efficiency, the reduction of the temporal resolution of the frame sequence may result in the introduction of temporal domain artifacts such as motion jerkiness which may significantly degrade the visual quality of the decoded video.

SUMMARY

This disclosure describes techniques for processing motion vectors associated with video blocks and sub-blocks. In particular, the techniques in this disclosure can be used to generate motion vectors that better correlate with true motion of objects within a video image (i.e., the actual path traversed by an object depicted within a video signal between successive frames). Motion vectors that better correlate with true motion of objects within a video signal may be useful in applications such as, e.g., motion compensated frame interpolation (MCI), moving object tracking, error concealment, or other video processing applications that utilize information relating to the true motion of objects within a frame sequence.

In some examples, the motion estimation techniques of this disclosure perform variable block-size motion estimation to produce multiple motion vector fields at different spatial resolutions. Spatial motion analysis and processing may be performed to select a block size and corresponding motion vector resolution for particular locations within a video frame. Different from other variable block-size motion estimation approaches, the proposed block split criterion described in this disclosure may be based on the analysis of motion vectors as opposed to direct analysis of spatial pixel values. By analyzing motion vectors having different resolutions for a given screen location, the techniques in this disclosure may be able to detect motion boundaries and coordinate the selection of motion vector resolution to better represent the motion within a video frame.

In additional examples, the motion estimation techniques of this disclosure may detect motion boundaries within a video frame, and perform a true motion selection process to select a motion vector spatial resolution for areas of a video frame located within the motion boundary. The true motion selection process may determine which spatial resolution of motion vector better correlates with neighboring motion vectors. By analyzing neighboring motion vectors in motion boundary areas, a smoother motion vector field may be obtained for areas of a video frame that occupy a motion boundary.

In further examples, the motion estimation techniques of this disclosure may perform temporal motion vector refinement to improve the temporal quality of a video frame sequence. Different from other bidirectional motion processes, the bidirectional refinement process described herein can be executed simultaneously with spatial motion vector analysis and processing stages. In this manner, the techniques in this disclosure allow for both spatial and temporal motion vector processing to be performed as a one-pass solution.

In one example, this disclosure describes a method that includes comparing a block motion vector to a sub-block motion vector. The block motion vector corresponds to a video block that includes a sub-block corresponding to the sub-block motion vector. The method further includes selecting one of the block motion vector and the sub-block motion vector as a spatially-estimated motion vector for the sub-block based on the comparison.

In another example, this disclosure describes a device that includes a motion estimation module. The motion estimation module is configured to compare a block motion vector to a sub-block motion vector, and select one of the block motion vector and the sub-block motion vector as a spatially-estimated motion vector for the sub-block based on the comparison. The block motion vector corresponds to a video block that includes a sub-block corresponding to the sub-block motion vector.

In another example, this disclosure describes an apparatus that includes means for comparing a block motion vector to a sub-block motion vector. The block motion vector corresponds to a video block that includes a sub-block corresponding to the sub-block motion vector. The apparatus further includes means for selecting one of the block motion vector and the sub-block motion vector as a spatially-estimated motion vector for the sub-block based on the comparison.

The techniques described in this disclosure may be implemented in hardware, software, firmware, or any combination thereof If implemented in hardware, an apparatus may be realized as an integrated circuit, a processor, discrete logic, or any combination thereof If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable storage medium and loaded and executed in the processor.

Accordingly, this disclosure also contemplates a computer-readable storage medium comprising instructions that upon execution in a processor cause the processor to compare a block motion vector to a sub-block motion vector, and select one of the block motion vector and the sub-block motion vector as a spatially-estimated motion vector for the sub-block based on the comparison. The block motion vector corresponds to a video block that includes a sub-block corresponding to the sub-block motion vector The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques for processing motion vectors associated with video blocks and sub-blocks. In particular, the techniques in this disclosure can be used to generate motion vectors that better correlate with "true motion" of objects within a video image (i.e., the actual path traversed by an object depicted within a video image between successive frames). Instead of identifying the true motion of objects within a frame sequence, conventional motion estimation algorithms used in predictive encoders generally try to maximize the coding efficiency and/or minimize the residual values, so that the motion vectors merely minimize a pre-defined cost function based on pixel values. However, for video applications that require information regarding the true motion of objects, such as, e.g., motion compensated frame interpolation (MCI), moving object tracking, and error concealment, these traditional codec-based motion vectors (MVs) are often too unreliable to be used. Therefore, the techniques in this disclosure may provide motion vectors that are more reliable for use in video applications that utilize information relating to the motion of objects within a video image.

According to this disclosure, the phrase "video block" may refer to any size of video block. Moreover, video blocks may refer to blocks of video data in the pixel domain, or blocks of data in a transform domain such as a discrete cosine transform (DCT) domain, a domain similar to DCT, a wavelet domain, or the like. A video block may be subdivided into one or more sub-blocks. The sub-blocks may have a smaller size than that of the subdivided video block. A video block that is subdivided to obtain a set of sub-blocks may be referred to as a major video block relative to one or more of the sub-blocks obtained from the subdivision of the video block. Thus, a major video block includes the sub-blocks obtained from subdividing the major video block. In addition, a "sub-block" may refer to a video block that includes a subset of the pixels included within a major video block. In addition, a video sub-block may itself be subdivided into smaller sub-blocks such that the video sub-block may be considered a major video block relative to the smaller sub-blocks obtained from subdividing the sub-block.

Figure 1:
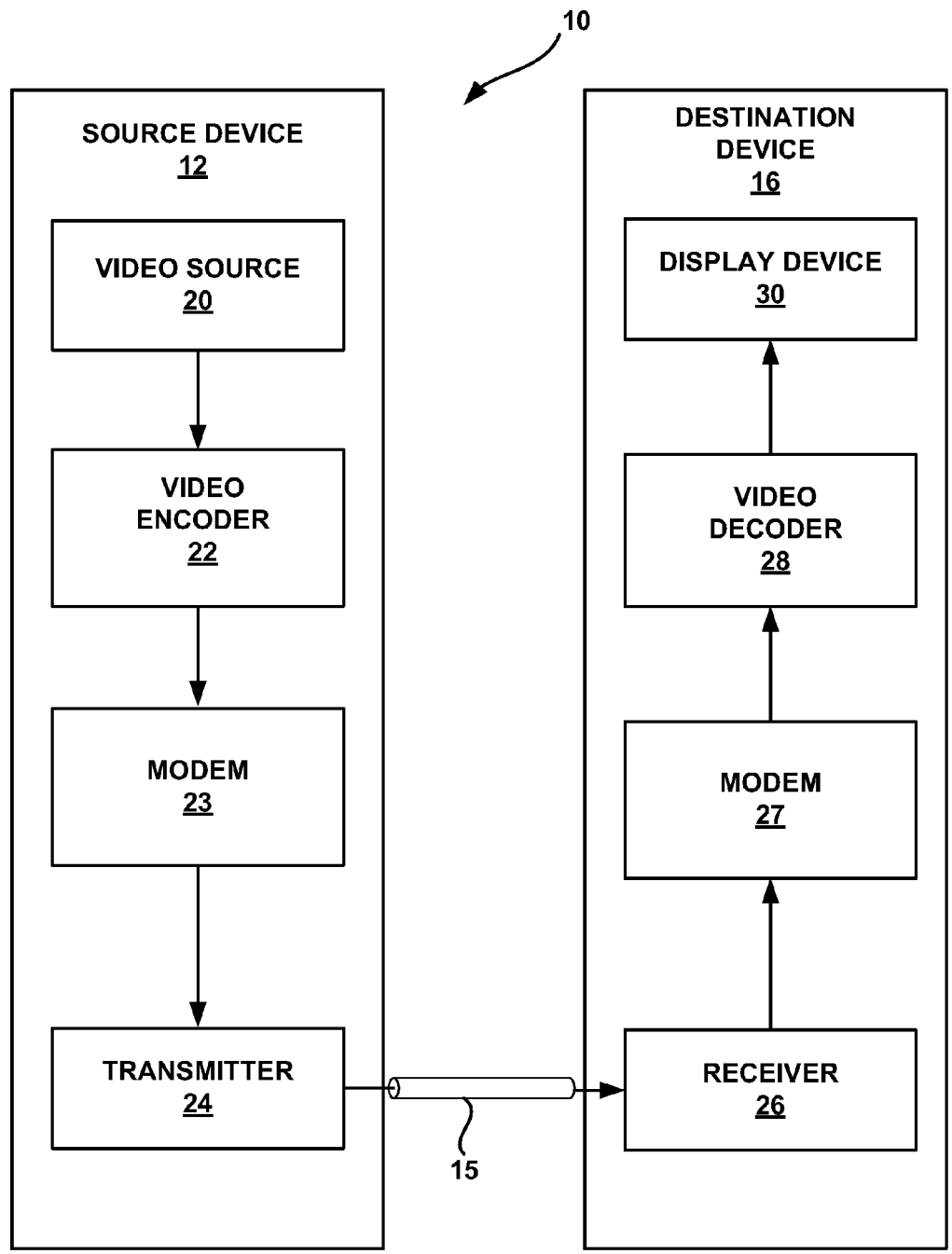
FIG. 1 is a block diagram illustrating an exemplary video encoding and decoding system that may implement techniques of this disclosure.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. Source device 12 and destination device 16 are merely examples of coding devices that can support such techniques.

Source device 12 is configured to generate an encoded bit-stream for transmission to destination device 16 over channel 15. Source device 12 includes a video source 20, a video encoder 22, a modulator/demodulator (modem) 23, and a transmitter 24.

Video source 20 is configured to provide raw video data to video encoder 22. The raw video data may include video frames, video fields, and/or video blocks. In some examples, video source 20 may comprise a video capture device, such as a video camera, a video archive containing previously captured video, or a video feed from a video content provider. Video source 20 may, in some examples, generate computer graphics-based data as the source video, or a combination of live video, archived video, and computer-generated video. If video source 20 is a video camera, source device 12 and destination device 16 may, in some cases, form so-called camera phones or video phones.

Video encoder 22 is configured to encode video data received from video source 20 to produce an encoded sequence of video frames and/or video blocks. Video encoder 22 may include any type of video encoder known in the art. In some examples, video encoder 22 may be a predictive encoder that generates a plurality of motion vectors in addition to the encoded video data. In other examples, video encoder 22 may not generate motion vectors.

In some examples, video encoder 22 operates on video blocks within individual video frames (or other independently coded units such as slices) in order to encode the video blocks. Frames, slices, portions of frames, groups of pictures (GOPs), or other data structures may be defined as independently decodable units that include a plurality of video blocks. In some cases, each video frame may include a series of independently decodable slices, and each slice may include a series of macroblocks, which may be arranged into even smaller blocks. The term "coded unit" may refer to frames, slices, portions of frames, groups of pictures (GOPs), or other data structures that are independently decodable. The video blocks within coded units may have fixed or varying sizes, and may differ in size according to a specified coding standard.

Macroblocks typically refer to 16 by 16 blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the phrase "video block" may refer to any size of video block. Moreover, video blocks may refer to blocks of video data in the pixel domain, or blocks of data in a transform domain such as a discrete cosine transform (DCT) domain, a domain similar to DCT, a wavelet domain, or the like. A video block may be subdivided into one or more sub-blocks. The sub-blocks may have a smaller size than that of the subdivided video block. A video block that is subdivided to obtain a set of sub-blocks may be referred to as a major video block relative to one or more of the sub-blocks obtained from the subdivision of the video block. Thus, a major video block includes the sub-blocks obtained from subdividing the major video block. In addition, a "sub-block" may refer to a video block that includes a subset of the pixels included within a major video block. In addition, a video sub-block may itself be subdivided into smaller sub-blocks such that the video sub-block may be considered a major video block relative to the smaller sub-blocks obtained from subdividing the sub-block.

If video encoder 22 is a predictive encoder, the encoder may compare a video block being encoded to a predictive frame (or other coded unit) in order to identify a predictive block. The differences between the current video block being coded and the predictive block are coded as a residual block. A predictive motion vector is used to identify the location of the predictive block relative to the video block to be encoded (i.e., the currently-processed video block). The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

Following transform and quantization, entropy coding may be performed on the quantized and transformed residual video blocks. Motion vectors may also be included in the entropy coded bit-stream for each coded unit. In general, entropy coding comprises one or more processes that collectively compress a sequence of quantized transform coefficients and/or other syntax information. Scanning techniques, such as zig-zag scanning techniques, are performed on the quantized transform coefficients, e.g., as part of the entropy coding process, in order to define one or more serialized one-dimensional vectors of coefficients from two-dimensional video blocks. The scanned coefficients are then entropy coded via, e.g., via content adaptive variable length coding (CAVLC), context adaptive binary arithmetic coding (CABAC), or another entropy coding process.

Modem 23 is configured to modulate the encoded video data according to a communication standard, e.g., such as code division multiple access (CDMA) or another communication standard or technique. Modem 23 may include various mixers, filters, amplifiers or other components designed for signal modulation.

Transmitter 24 is configured to transmit the modulated video data as a bit-stream to destination device 16 via transmission channel 15. Transmitter 24 may include circuits designed for transmitting data, including amplifiers, filters, and one or more antennas.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Destination device 16 is configured to receive an encoded bit-stream from source device 12 over channel 15, and to decode and display the video information contained within the encoded bit-stream. Destination device 16 may include a receiver 26, a modem 27, a video decoder 28, and a display device 30. In accordance with this disclosure, video decoder 28 of destination device 12 may be configured to perform the spatial and temporal motion vector processing techniques described herein.

Receiver 26 is configured to receive modulated video data over channel 15 and to provide the received data to modem 27. Modem 27 is configured to demodulate the modulated video data to produce demodulated video data. Video decoder 28 is configured to decode the demodulated video data into decoded video data. The decoded video data may include video frames, video blocks and/or video fields. In some examples, video decoder 28 may be a predictive encoder that utilizes motion vectors generated by video encoder 22. In other examples, video decoder 28 may not utilize motion vectors generated by video encoder 22. The video decoding process performed by video decoder 28 may include motion compensated frame interpolation (MCI), e.g., as part of a frame rate up conversion module.

According to this disclosure, video decoder 28 may also include a true motion estimation module that performs spatial and temporal motion vector processing. For example, video decoder 28 may be configured to compare a block motion vector to a sub-block motion vector, and select one of the block motion vector and the sub-block motion vector as a spatially-estimated motion vector for the sub-block based on the comparison. The block motion vector corresponds to a video block that includes a sub-block corresponding to the sub-block motion vector.

As another example, video decoder 28 may be configured to detect if a video block or sub-block occupies a motion transition area within a video frame, and if so, perform a true motion selection algorithm to select a spatially-estimated motion vector. As part of the true motion selection algorithm, video decoder 28 may be configured to select either a block motion vector or sub-block motion vector depending on which motion vector better correlates with neighboring motion vectors. For example, video decoder 28 may be configured to determine a first motion distance between the block motion vector and at least one spatially-estimated motion vector corresponding to a first neighboring sub-block, determine a second motion distance between the sub-block motion vector and at least one spatially-estimated motion vector corresponding to a second neighboring sub-block, compare the first motion distance to the second motion distance, and select one of the block motion vector and the sub-block motion vector based on the comparing the first motion distance to the second motion distance.

As another example, video decoder 28 may be configured to perform a bidirectional temporal refinement process. As part of the bidirectional temporal refinement process, video decoder 28 may be configured to compare a spatially-estimated motion vector for the sub-block to a spatially-estimated motion vector for a neighboring sub-block, and select one of the spatially-estimated motion vector for the sub-block and the spatially-estimated motion vector for the neighboring sub-block as a temporally-refined motion vector for the sub-block based on the comparison. In some examples, video decoder 28 may select a motion vector that minimizes a cost function from a set of motion vectors. The set of motion vectors includes the spatially-estimated motion vector for a currently-processed sub-block and spatially-estimated motion vectors for neighboring sub-blocks.

The motion vectors produced by the techniques described herein may better correlate with the true motion of objects within a video frame. Motion vectors that better correlate with true motion may be useful in applications such as motion compensated frame interpolation (MCI), moving object tracking, error concealment, or other video post-processing that requires the true motion information.

Display device 30 is configured to display the decoded video data to a user. Display device 30 may include any of a variety of display devices such as a cathode ray tube (CRT), a liquid crystal display (LCD), a plasma display, an organic light emitting diode (OLED) display, or another type of display device.

Video encoder 22 and video decoder 28 may operate according to a video compression standard such as the ITU-T H.264 standard, alternatively referred to as MPEG-4, Part 10, Advanced Video Coding (AVC). However, the techniques of this disclosure may be readily applied to any of a variety of other video coding standards. Specifically, any standard that allows for filtering at the encoder and decoder may benefit from the teaching of this disclosure by reducing the amount of data needed to communicate filter information from the encoder to the decoder.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof Each of video encoder 22 and video decoder 28 may be included in one or more encoders or decoders, either of which may be integrated as part of a combined encoder/decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

Figure 2:
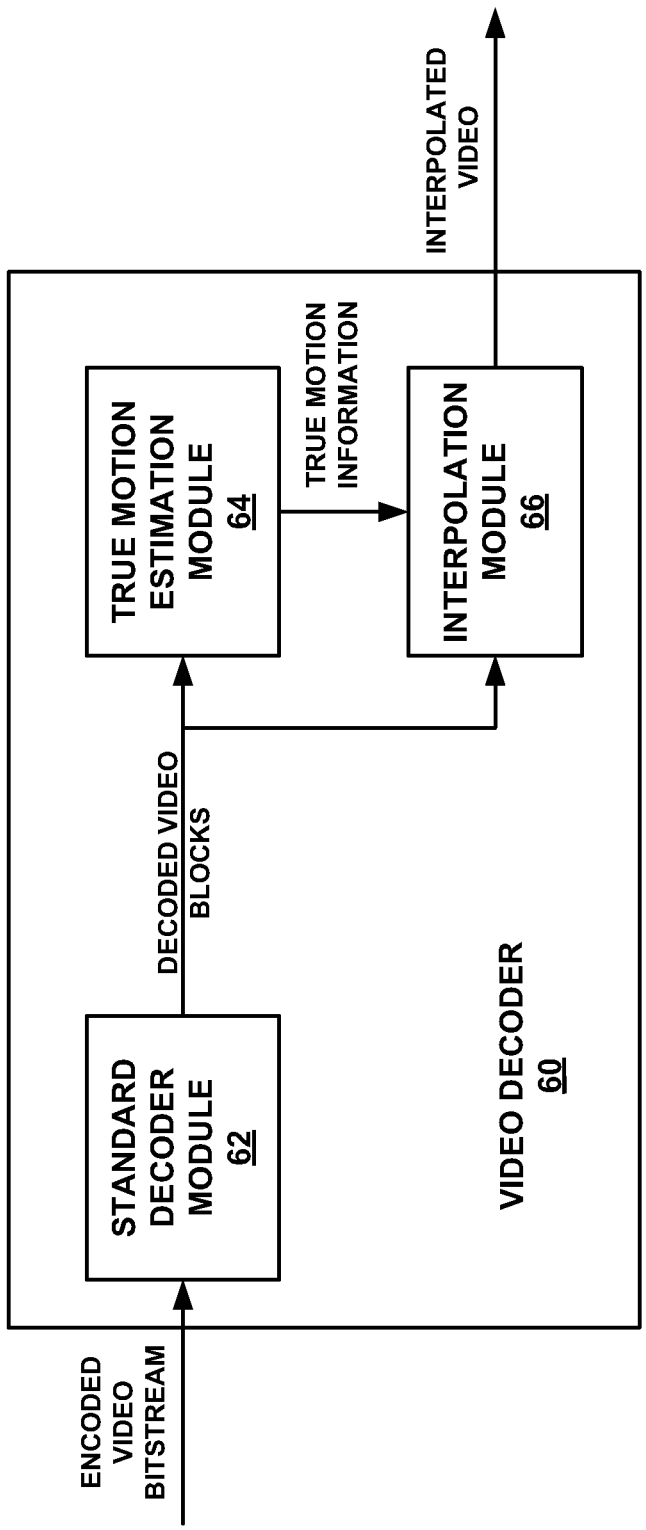
FIG. 2 is a block diagram illustrating an example of a video decoder according to this disclosure.

FIG. 2 is a block diagram illustrating an example of a video decoder 60 according to this disclosure. Video decoder 60 may correspond to video decoder 28 of device 16, or to a video encoder of a different device. Video decoder 60 includes a standard decoder module 62, a true motion estimation module 64, and an interpolation module 66.

Standard decoder module 62 receives an encoded video bit-stream, decodes the bit-stream to produce decoded video blocks and/or decoded frames. In some examples, standard decoder module 62 may also extract motion information, such as motion vectors from the encoded bit-stream. The received video sequence may comprise an encoded set of image frames, a set of frame slices, a commonly coded group of pictures (GOPs), or a wide variety of coded video units that include encoded video blocks and syntax to define how to decode such video blocks. In some examples, the macroblocks or other video blocks may be coded units, e.g., if the macroblocks are encoded as separately decodable units.

Standard decoder module 62 may, in some examples, be a conventional predictive decoder. For example, standard decoder module 62 may include an entropy decoding unit, which performs the reciprocal decoding function of the encoding performed by entropy encoder. In particular, entropy decoding unit may perform CAVLC or CABAC decoding, or any other type of entropy decoding used by a predictive video encoder. Entropy decoded video blocks in a one-dimensional serialized format may be inverse scanned to convert one or more one-dimensional vectors of coefficients back into a two-dimensional block format. The number and size of the vectors, as well as the scan order defined for the video blocks may define how the two-dimensional block is reconstructed.

Standard decoder module 62 may also include an inverse quantization unit that performs inverse quantization, and an inverse transform unit that performs inverse transforms to change the coefficients of the residual video blocks back to the pixel domain. Entropy decoded motion vectors may be sent to a prediction unit, which may retrieve prediction blocks from a memory containing previously reconstructed video blocks. An adder unit may generate reconstructed video blocks by adding the prediction blocks to the residual blocks produced by inverse transform unit.

The predictive decoder described above for standard decoder module 62 is merely one example of a standard decoder module. Other types of decoders, both predictive and non-predictive may be used with the techniques described herein. In general, any decoder that decodes an encoded video data to produce decoded video data may be used to implement standard decoder module 62 without departing from the scope of this disclosure.

True motion estimation module 64 is configured to generate a spatially-estimated motion vector field and/or a temporally-refined motion vector field for a plurality of decoded video blocks. In some examples, true motion estimation module 64 may receive the plurality of decoded video blocks from standard decoder module 62. As used herein, true motion information may refer to one or more spatially-estimated motion vectors, one or more temporally-refined motion vectors, a spatially-estimated motion vector field, and/or a temporally-refined motion vector field. According to this disclosure, true motion estimation module 64 may generate a plurality of motion vector fields having different block size resolutions. True motion estimation module 64 may select motion vectors from each of the motion vectors fields to generate a spatially-estimated motion vector field. The selection criteria may be based on a spatial motion analysis algorithm that determines whether a currently-processed sub-block occupies a motion transition area within a video frame. When the currently-processed sub-block occupies a motion transition area, true motion estimation module 64 may perform a true motion selection algorithm, which determines which resolution of motion vector better corresponds with the surrounding motion distribution.

True motion estimation module 64 may also perform a bidirectional temporal refinement on the spatially-estimated motion vector field to generate a temporally-refined motion vector field. The temporally-refined motion vectors for a currently-processed sub-block may be selected from a set of motion vectors that includes motion vectors for the currently-processed sub-block and neighboring sub-blocks. A temporal motion analysis algorithm determines whether a currently-processed sub-block occupies a motion transition area within a video frame. If the motion vector does not occupy a motion transition area, the spatially-estimated motion vector will be selected. When the currently-processed sub-block occupies a motion transition area, true motion estimation module 64 may perform the bidirectional temporal refinement process, which determines which of the local motion vectors minimizes a bidirectional cost function. The details of the spatial and temporal motion vector processing algorithms performed by true motion estimation module 64 will be described in further detail below.

Interpolation module 66 is configured to perform motion compensated frame interpolation (MCI) based on the true motion information received from true motion estimation module 64. MCI may be used in order to provide video frames for insertion into a video sequence as part of a frame rate up conversion (FRUC) process. Frame rate up conversion (FRUC) may be used by a receiver to insert frames within a video sequence that were dropped due to a frame skipping algorithm. MCI algorithms may use a reconstructed video frame and a transmitted set of motion vectors to interpolate the missing frames. If the motion vectors used by the MCI algorithm are conventional motion vectors (i.e., motion vector that are generated by a predictive encoder and based upon the minimizing a cost function), such motion vectors may not match the object motion within the video frame, which can result in motion jerkiness, "ghost" images, blurring of moving objects, and other temporal artifacts.

According to this disclosure, the spatial and temporal motion vector processing techniques may produce motion vectors that better represent or track the movement of actual objects within a video frame. Thus, by using the spatially-estimated motion vectors and/or temporally-refined motion vectors described herein, interpolation module 66 may be able to produce an interpolated frame sequence (e.g., a frame rate up-converted frame sequence) with improved temporal quality.

In some examples, interpolation module 66 may divide the x- and y-components of a motion vector contained within the true motion information by a factor of two. The motion vector may be a spatially-estimated motion vector and/or a temporally-refined motion vector. The resulting motion vector may be used as a motion vector between two decoded frames. To generate the pixel values, interpolation module 66 may perform bidirectional motion compensation.

Figure 3:
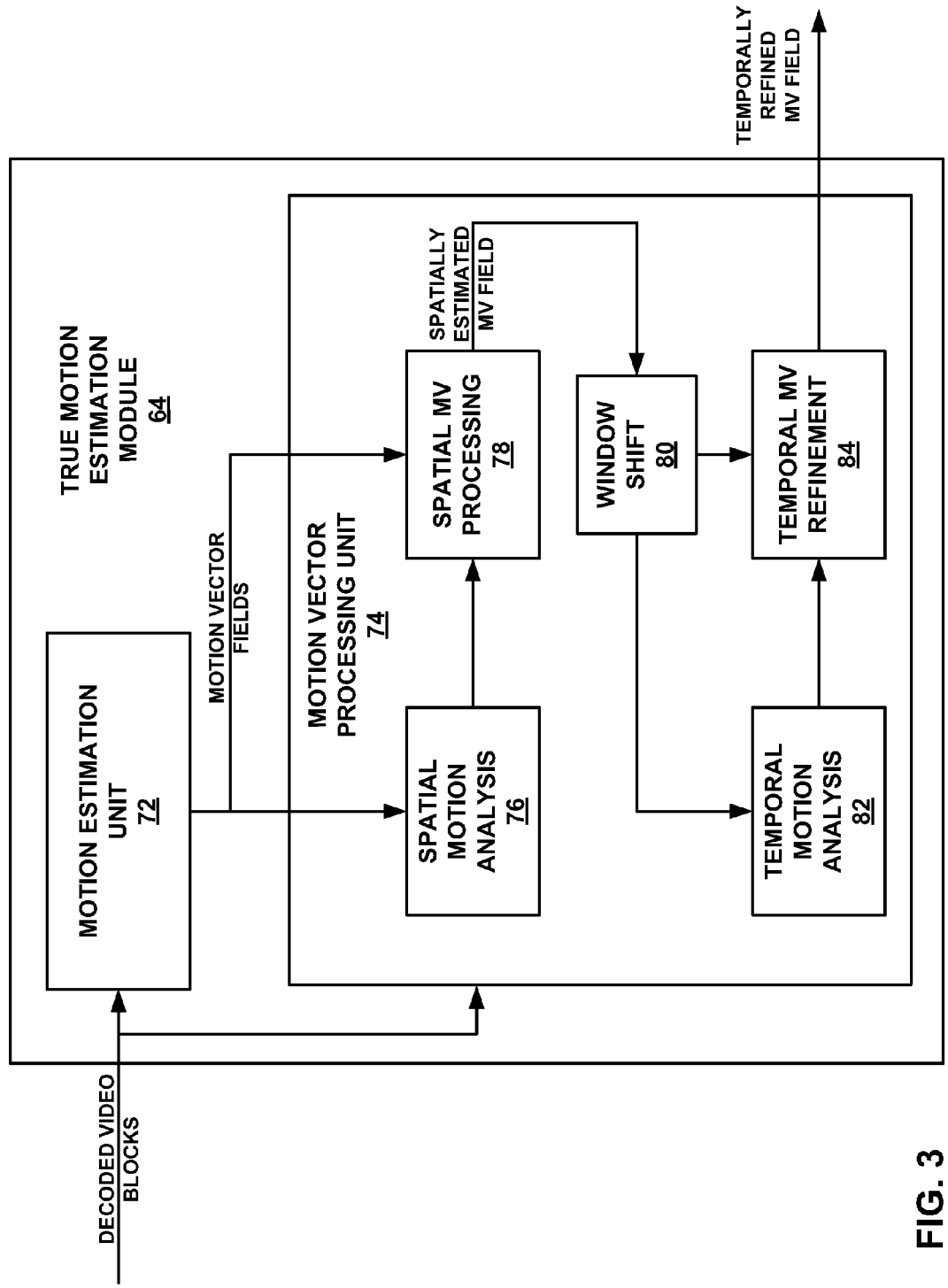
FIG. 3 is a block diagram illustrating an example of a motion estimation module according to this disclosure.

FIG. 3 is a block diagram illustrating a true motion estimation module 64 according to this disclosure. True motion estimation module 64 is configured to generate a spatially-estimated motion vector field and/or a temporally-refined motion vector field for a plurality of decoded video blocks. In other words, true motion estimation module 64 may generate reliable motion vectors that are refined by spatial refinement and/or temporal refinement. True motion estimation module 64 includes motion estimation unit 72 and motion vector processing unit 74.

Motion estimation unit 72 generates a plurality of motion vectors for a received set of video blocks. The plurality of motion vector may be referred to as a motion vector field. In some examples, motion estimation unit 72 may be a variable block-size motion estimation unit. In such examples, motion estimation unit 72 may generate multiple motion vector fields of different resolutions corresponding to different sizes of video blocks. For example, motion estimation unit 72 my generate a first motion vector field corresponding to a video blocks having a first block size, and a second motion vector field corresponding to video blocks having a second block size. The second video block size may be obtained by subdividing the video blocks of the first block size into smaller video blocks (i.e., sub-blocks). The motion vectors corresponding to the first block size may form a first motion vector field. Similarly, the motion vectors corresponding to the second block size may form a second motion vector field. As used herein, a block motion vector field refers to a motion vector field containing motion vectors corresponding to the first block size, and a sub-block motion vector field refers to a motion vector field containing motion vectors corresponding to the second block size.

As one example, the video blocks having the first block size may correspond to the video block size used by a predictive coding unit (e.g., a 16×16 macroblock), and the video blocks having the second block size may correspond to 8×8 sub-blocks contained within the 16×16 macroblocks. In such examples, the 16×16 macroblock is sub-divided into four 8×8 sub-blocks. A motion vector may be generated for the macroblock and for each of the sub-blocks. The collection of motion vectors for the macroblock may be referred to as a set of block motion vectors or a block motion vector field. The collection of motion vectors for the sub-block may be referred to as a set of sub-block motion vectors or a sub-block motion vector field. In other examples, the video blocks having the first block size may correspond to H.264 macroblocks, the video blocks having the second block size may correspond to various H.264 partitions, such as 8×16 partitions, 4×4 partitions, etc. In general, any combination of video blocks having a first block size (i.e., major video blocks) and video blocks having a second block size (i.e., sub-blocks) may be used without departing from the scope of this disclosure.

In some cases, motion estimation unit 72 may receive one or more of the motion vectors and/or motion vector fields from standard decoder module 62. In such cases, one or more of these motion vectors may be generated by a predictive encoder and transmitted over a transmission channel in conjunction with the transmission of the video blocks. As one example, motion estimation unit 72 may receive block motion vectors that were generated during a predictive encoding of the video frame. As another example, motion estimation unit 72 may receive both block motion vectors and sub-block motion vectors that were generated during a variable block-size predictive encoding scheme. In any case, motion estimation unit 72 may use motion vectors received from a predictive encoder to generate some, none, or all of the motion vectors contained within the motion vector fields.

For two consecutive frames $f_{t-1}$ and $f_t$, the motion vectors may be estimated according to a cost function. In some examples, the cost function may be a sum of absolute difference (SAD) cost function, which can be written as follows:

$$SAD(v) = \sum_{x,y \in B} |f_{t-1}(x + v_x, y + v_y) - f_t(x, y)| \quad (1)$$

$$v^* = \min_{v \in S}(SAD(v))$$

where B represents a particular video block (e.g., a macroblock) location within a video frame, x and y represent x- and y-coordinates (e.g., pixel locations) within the video frame, $v=[v_x,v_y]$ represents a candidate motion vector, $v_x$ represents the x-component of the motion vector, $v_y$ represents the y-component of motion vector, $f_t(x, y)$ represents a pixel value (e.g., a luminance value, a chrominance value, or a combination of luminance and chrominance values) for a pixel located at location (x, y) in frame $f_t$, S represents a set of motion vectors defined by a motion search range, $v^*$ represents the best obtained motion vector for block B.

Figure 4:
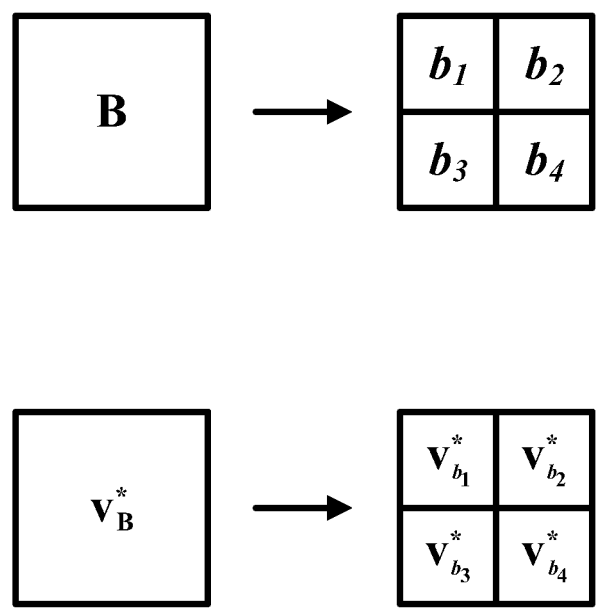
FIG. 4 is a conceptual diagram illustrating the subdivision of a video block along with corresponding motion vectors according to this disclosure.

In some examples, motion estimation unit 72 may perform a variable-block-size motion estimation procedure. During the variable-block-size motion estimation procedure, motion estimation unit 72 may divide each video block, B(i, j), into a set of sub-blocks, $\{b_1, b_2, b_3, b_4\}$, having a smaller block size. FIG. 4 is a conceptual diagram illustrating the subdivision of a video block along with the corresponding motion vectors. As shown in FIG. 4, video block B may be subdivided into sub-blocks $b_1$, $b_2$, $b_3$, and $b_4$. In addition, $v_B^*$ may designate the block motion vector for video block B, and $v_{b_k}^*$ may designate the sub-block motion vector for sub-block $b_k$.

As used herein, a "video block" may refer to any size of video block. A video block may be subdivided into one or more sub-blocks. The sub-blocks may have a smaller size than that of the subdivided video block. A video block that is subdivided to obtain a set of sub-blocks may be referred to as a major video block relative to one or more of the sub-blocks obtained from the subdivision of the video block. Thus, a major video block includes the sub-blocks obtained from subdividing the major video block. In addition, a "sub-block" may refer to a video block that includes a subset of the pixels included within a major video block. In addition, a video sub-block may itself be subdivided into smaller sub-blocks such that the video sub-block may be considered a major video block relative to the smaller sub-blocks obtained from subdividing the sub-block.

Since a video frame may include multiple video blocks, the individual video blocks within a video frame may be indexed as a two-dimensional array. In such cases, the individual blocks may be denoted as B(i, j) where B(i, j) represents the video block at location (i, j) within the two-dimensional array of video blocks. Similarly, the video sub-blocks may be denoted as $b_k(i, j)$ where $b_k$ indicates the kth sub-block within block B(i, j). Within a predefined search range, S, the best motion vector, $v_B^*$, for each block, B(i, j), may be selected based on which motion vector minimizes the cost function (e.g., which MV produces a minimal SAD value). Similarly, search range, S, the best motion vector, $v_{b_k}^*$, for each sub-block, $b_k(i, j)$, may be selected based on which motion vector minimizes the cost function.

Motion estimation unit 72 may generate the motion vectors for block, B(i, j), and for sub-blocks, $\{b_1, b_2, b_3, b_4\}$. In some examples, the motion vectors for the sub-blocks may be calculated according to the following equations:

$$SAD(v_{b_k}) = \sum_{x,y \in b_k} |f_{t-1}(x + v_x, y + v_y) - f_t(x, y)| \quad (2)$$

$$v_{b_k}^* = \min_{v_{b_k} \in S}(SAD(v_{b_k}) + w \cdot \|v_{b_k}\|).$$

where $b_k$ represents a particular sub-block within a video block, $v_{b_k}$ represents a candidate sub-block motion vector for sub-block $b_k$, S represents a set of motion vectors defined by a motion search range, w represents a weighting factor, $\|v_{b_k}\|$ represents the distance (e.g., Euclidean norm or Euclidean distance) from $v_{b_k}$ to v=[0, 0], and $v_{b_k}^*$ represents the best obtained motion vector for sub-block $b_k$.

In some examples, motion estimation unit 72 may generate the block motion vector independently of the corresponding sub-block motion vectors according to equation (1). In other examples, motion estimation unit 72 may generate the block motion vector based on one or more of the sub-block motion vectors associated with the major block. In such examples, the motion vectors for the sub-blocks may be calculated prior to the motion vector for the corresponding major video block.

For example, the motion vector for the larger block size (i.e., B(i, j)) may be obtained by accumulating the SAD values as follows:

$$SAD(v_B) = \sum_{k=\{1,2,3,4\}} SAD(v_{b_k}) \quad (3)$$

$$v_B^* = \min_{v_B \in S}(SAD(v_B) + 4w \cdot \|v_B\|).$$

where $v_B$ represents a candidate block motion vector corresponding to video block B that includes sub-blocks $\{b_1, b_2, b_3, b_4\}$, $v_{b_k}$ represents a candidate sub-block motion vector for sub-block $b_k$, S represents a set of motion vectors defined by a motion search range, w represents a weighting factor, $\|v_B\|$ represents the distance (e.g., Euclidean norm or Euclidean distance) from $v=[0, 0]$ to $v_B$, and $v_B{}^*$ represents the best obtained motion vector for block B.

During each SAD calculation, in such examples, the major SAD value for B(i, j) may be obtained by summing the SAD values of the four sub-blocks. In some cases, for a candidate motion vector $[v_x, v_y]$, five SAD values, $\{SAD_B, SAD_{b1}, SAD_{b2}, SAD_{b3}, SAD_{b4}\}$, may be accessed. The five SAD values may then compared to their respective minimum SAD value in a minimal value set, $\{SAD_{B,min}, SAD_{b1,min}, SAD_{b2,min}, SAD_{b3,min}, SAD_{b4,min}\}$. If the one or more of the SAD values for the candidate motion vector is less than the corresponding SAD value in the minimal value set, the minimum SAD value in the minimal value set may be updated with the SAD value of the candidate motion vector. The candidate motion vector corresponding to the minimum SAD value may also be recorded. In this manner, motion estimation unit 72 obtains the best motion vector for a video block and for each of the sub-blocks included in the video block.

In equations (2) and (3), the weighting factor, w, may indicate the degree to which motion vectors near the origin (i.e., [0, 0]) are favored. In general, the higher the weighting factor, the greater degree to which motion vectors near the origin are favored. A zero weighting factor indicates that all motion vectors are treated equally regardless of their distance from the origin. In some examples, the weighting factor, may be set to a value of 10 to favor zero motion (i.e., motion vectors that are near the origin).

In some cases, there will be only one minimum SAD error value, and the best motion vector can be determined based on the minimum SAD value. However, if the video clip contains very smooth contents, e.g., plain pixel distribution, a video block may have multiple motion vectors having the same minimum SAD values or weighted distortion errors. In such cases, the motion vector nearest to the origin (i.e., nearest to the zero motion vector) is favored. The reason behind this is that the correct motion often distributes stably unless the motion distribution has sudden spatial or temporal transitions. Thus, in order to determine the motion vector with minimum SAD (or weighted distortion errors) and closest to the origin, motion estimation unit 72 may perform the motion estimation in a spiral order. If multiple motion vectors with the same minimum SAD (or weighted distortion errors) have been identified, motion estimation unit 72 may select the motion vector with minimum SAD that is first in the spiral search order as the motion vector for the block.

Figure 5:
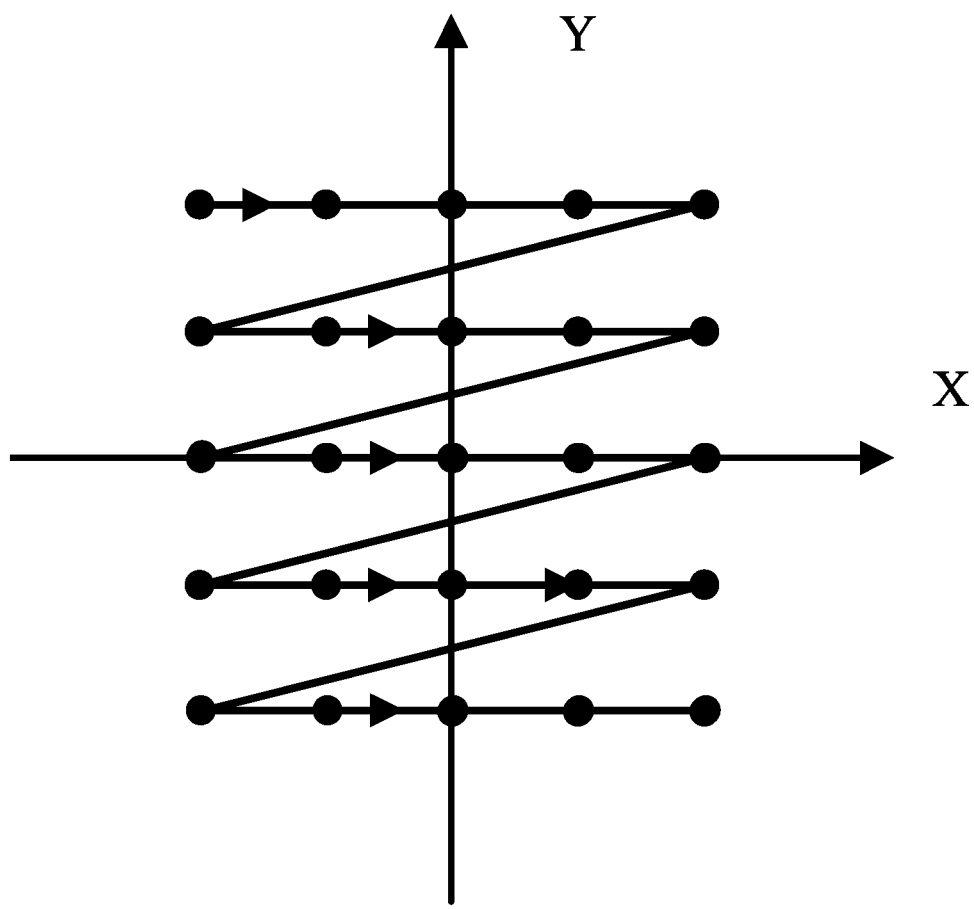
FIG. 5 is a conceptual diagram illustrating a raster scan ordering for a motion search algorithm according to this disclosure.
Figure 6:
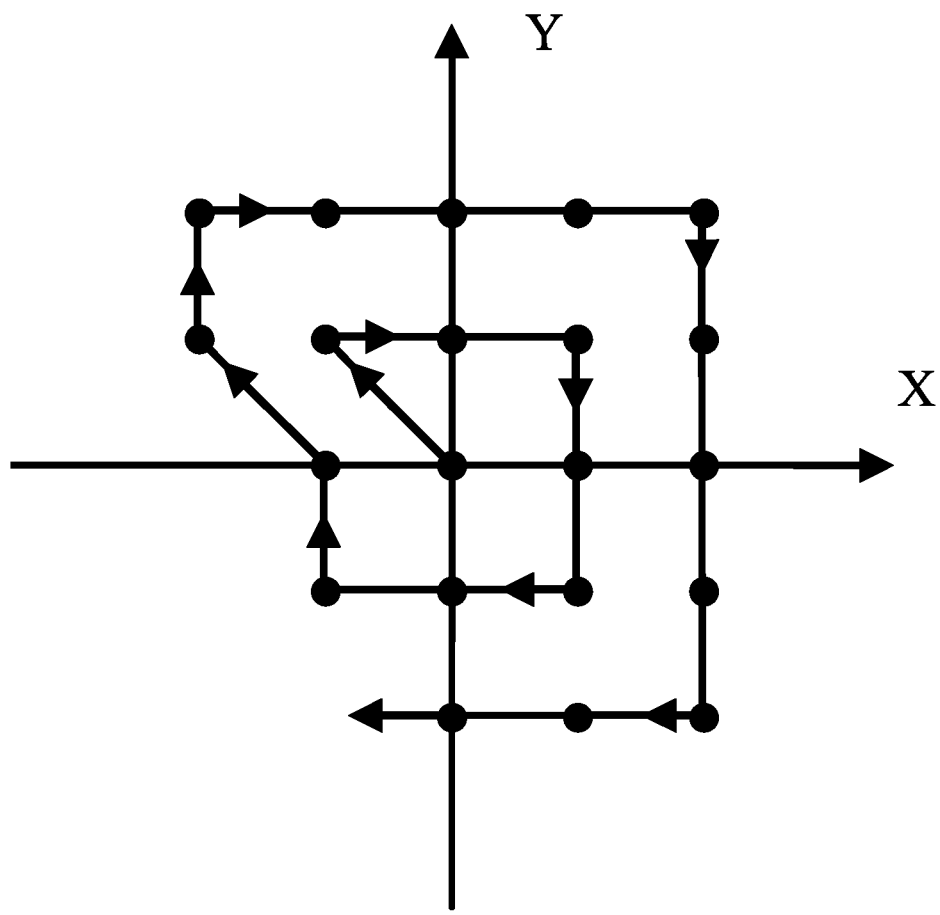
FIG. 6 is a conceptual diagram illustrating a spiral ordering for a motion search algorithm according to this disclosure.

FIG. 5 is a conceptual diagram illustrating a raster scan ordering for a motion search algorithm, and FIG. 6 is a conceptual diagram illustrating a spiral ordering for a motion search algorithm. As shown in FIG. 5, when a raster scan order is used for a motion search, once multiple same minimum SAD values occur, the motion vector that produces the best motion may not be selected. However, as shown in FIG. 6, a spiral motion search order may produce a motion vector that the selected motion has minimum distortion error and minimum distance from the search origin as well. As such, a motion vector field generated by using spiral ordering may be more coherent as compared to raster scan order.

Motion vector processing unit 74 receives the motion vector fields from motion estimation unit 72 and generates a spatially-estimated motion vector field and/or a temporally-refined motion vector field based on the received motion vector fields. Motion vector processing unit 74 includes spatial motion analysis module 76, spatial motion vector processing module 78, temporal motion analysis module 82, and temporal motion vector refinement module 84.

Spatial motion analysis module 76 generates a spatial motion transition mask based on the motion vector fields for a plurality of video blocks and a plurality of sub-blocks. In addition, spatial motion analysis module 76 may generate a spatially-estimated motion vector field based on the spatial motion analysis. In some examples, the spatially-estimated motion vector field may be a partially-populated spatial motion vector field. In other words, in some examples, only a subset of the sub-blocks may have spatially-estimated motion vectors after processing by spatial motion analysis module. Spatial motion vector processing module 78 applies the spatial motion transition mask to the spatially-estimated motion vector field to generate a fully-populated spatially estimated motion vector field. Together, spatial motion analysis module 78 and spatial motion vector processing module 78 provide a set of motion vectors that better correlate with the true motion that takes place in a video frame.

The spatially-estimated motion vector field may be represented as $MVF_S(b_k(i, j))$. The spatially-estimated motion vector field may contain motion vectors selected for each sub-block, and may be a combination of the block motion vector field, MVF(B(i, j)), and the sub-block motion vector field, $MVF(b_k(i, j))$.

Figure 7:
FIG. 7 is a conceptual diagram illustrating the combination of the block motion vector field and the sub-block motion vector field to generate a spatially-estimated motion vector field according to this disclosure.

FIG. 7 is a conceptual diagram illustrating the combination of the block motion vector field and the sub-block motion vector field to generate a spatially-estimated motion vector field for block B(i, j) and its sub-blocks $\{b_1, b_2, b_3, b_4\}$. The block motion vector, $v_B{}^*$, may be associated with the each of the sub-blocks included within the major video block. As shown in FIG. 7, when associated with sub-block $b_k$, the major motion vector may be denoted as $v_{B_k}{}^*$ where each $v_{B_k}{}^*$ is equal to $v_B{}^*$ for any k. FIG. 7 also illustrates that the spatially-estimated motion vector, $v_k$, corresponding to sub-block k is equal to either the corresponding block motion vector, $v_{B_k}{}^*$ or the corresponding sub-block motion vector, $v_{b_k}{}^*$.

The motion analysis procedure may determine how the motion vectors should distribute between block motion vectors and sub-block motion vectors. Spatial motion analysis module 76 may use the block and sub-block motion vector fields to determine if the current block is located on one or more motion boundaries. The motion transition detection techniques described herein may be used to determine whether to further split the video blocks into finer block sizes. If there are possible motion boundaries in the area surrounding the video block, true motion vector selection techniques described herein may decide which motion vector is the most suitable motion vector for the current sub-block, $b_k$, among all available motion vectors ($v_B{}^*$ and $v_{b_k}{}^*$). For blocks located in non-motion-transition areas, spatial motion analysis module 76 may determine: (1) that the block is located in an area of the video frame where there is no motion transition; or (2) that this is an unsure case.

Spatial motion analysis module 76 generates a spatial motion transition mask based on the motion vector fields for a plurality of video blocks and a plurality of sub-blocks. Spatial motion vector processing module 78 applies the spatial motion transition mask to the motion vector field to generate a spatially-estimated motion vector field. Together spatial motion analysis module 78 and spatial motion vector processing module 78 provide a set of motion vectors that better correlate with the true motion that takes place in a video frame.

Spatial motion analysis module 76 may receive the motion vector fields generated by motion estimation module 72 for video blocks at different resolutions. For example, spatial motion analysis module 76 may receive a motion vector field, MVF(B(i, j)), corresponding to the motion vectors for the major video blocks within a video frame. Spatial motion analysis module 76 may also receive a motion vector field, MVF($b_k$(i, j)), corresponding to the motion vectors for the sub-blocks within the video frame.

Although the motion vector fields are described herein as being addressed by the block or sub-block itself, in additional examples, the motion vector in the motion vector fields may be addressed according to indices. In such examples, the block motion vector field and the sub-block motion vector field may be combined into a single motion vector field. For example, the indices may correspond with the indices used to address the blocks and sub-blocks (e.g., MVF(k, i, j) where k=0 indicates the major block and k>0 indicates the appropriate sub-block). Any manner of indexing the motion vectors within the motion vector fields is suitable for use in accordance with the techniques of this disclosure.

Spatial motion analysis module 76 may detect if the current block, B(i, j), is located on a motion boundary. In some examples, spatial motion analysis module 76 may calculate the motion distance between $v_B^*$ and $v_{b_k}^*$. In such examples, the motion distance may be calculating performing a Euclidean norm operation on the difference between the two motion vectors. If the motion distance is larger than a predefined threshold, $TH_{mt1}$, the sub-block may be located in a portion of the video frame having motion transitions. If not, the sub-block may be located in areas of the video frame with smooth contents or the areas within the same moving object in the video frame.

Spatial motion analysis module 76 may, in some examples, generate a motion transition mask (MTM) for each sub-block, $b_k$, within a video block, B, as follows:

$$\begin{cases} MTM(k) = 2, \text{ if } \left\| v_B^* - v_{b_k}^* \right\|_2 > TH_{mt1} \\ MTM(k) = 1, \text{ if } 0 \le \left\| v_B^* - v_{b_k}^* \right\|_2 < TH_{mt2} \\ MTM(k) = 0, \text{ otherwise.} \end{cases} \quad (4)$$

In the above expression, $v_B^*$ represents the estimated block motion vector for a given video block B, $v_{b_k}^*$ represents the estimated sub-block motion vector for a given sub-block $b_k$ contained within block B, $\|\bullet\|_2$ represents the Euclidean norm or Euclidean distance applied to the expression contained within the brackets, MTM(k) represents the motion transition mask value for sub-block $b_k$, $TH_{mt1}$ represents a first threshold, and $TH_{mt2}$ represents a second threshold.

According to equation (4), spatial motion analysis module 76 may determine a motion distance (e.g., $\|v_B^* - v_{b_k}^*\|_2$) between the sub-block motion vector and the block motion vector. The sub-block motion vector may correspond to a sub-block of the video block associated with the block motion vector. When the motion distance is greater than a first threshold, spatial motion analysis module 76 may assign a value of two to the motion transition mask for the sub-block. When the motion distance is less than a second threshold, spatial motion analysis module 76 may assign a value of one to the motion transition mask for the sub-block. Otherwise spatial motion analysis module 76 may assign a value of zero to the motion transition mask for the sub-block. In some examples, the first threshold may be greater than the second threshold (i.e., $TH_{mt1} > TH_{mt2}$).

The two different thresholds may be used to differentiate three different cases; a first case where the sub-block is located in an area of motion transition, a second case where the sub-block is located within a moving object, and a third case where the sub-block may or may not be located within an area of motion transition (i.e., an unsure case). The first threshold may be used to identify the first case (i.e., a motion transition area). In other words, the first threshold, $TH_{mt1}$, may indicate a motion distance above which a video sub-block may be regarded as occupying a motion transition area. In such a case, a suitable motion vector for the sub-block may be selected by analyzing the neighboring well-established motion vectors as described in further detail later in this disclosure.

The second threshold may be used to identify the second case (i.e., the sub-block is located within a moving object). In other words, the second threshold, $TH_{mt2}$, may indicate a motion distance below which a video sub-block may be regarded as not occupying a motion transition area of the video frame. In such a case, internal motion adjustments may be needed, because even within same moving objects, the motion distribution may still slightly vary. Therefore, in the second case, the sub-block motion vector ($v_{b_k}^*$) may be selected as the final spatially-estimated motion vector.

A third case may be defined where the difference between $v_B^*$ and $v_{b_k}^*$ is not large enough to become a motion transition area and is not small enough to become a non-motion transition area. Such a case may be referred to as an "unsure case," and the block motion vector ($v_B^*$) may be selected as the final spatially-estimated motion vector.

In some examples, the calculations in equation (4) to determine possible motion boundaries may be simplified and implemented as follows:

$$\begin{cases} MTM(k) = 2, \text{ if } |v_{B,x} - v_{b_k,x}| + |v_{B,y} - v_{b_k,y}| > TH_{mt1} \\ MTM(k) = 1, \text{ if } 0 \le |v_{B,x} - v_{b_k,x}| + |v_{B,y} - v_{b_k,y}| < TH_{mt2} \\ MTM(k) = 0, \text{ otherwise} \end{cases} \quad (5)$$

where $v_B^* = (v_{B,x}, v_{B,y})$ and $v_{b_k}^* = (v_{b_k,x}, v_{b_k,y})$, and $|\bullet|$ represents an absolute value operator. Thus, in equation (5) absolute scale differences may be used to determine the motion distance rather than Euclidean differences. In this manner, a motion transition mask may be obtained without the need to perform square root calculations. In one example, the thresholds, $TH_{mt1}$ and $TH_{mt2}$, may be set to values of 6 and 3, respectively.

Spatial motion vector processing module 78 may generate a spatially-estimated motion vector field, $MVF_S(b_k(i, j))$, based on the input motion vector fields and the spatial motion transition mask. The spatially-estimated motion vector field may contain motion vectors selected for each sub-block, and may be a combination of the block motion vector field, MVF (B(i, j)), and the sub-block motion vector field, MVF($b_k$(i, j)).

In cases where spatial motion analysis module 76 determines that the currently processed sub-block does not occupy a motion transition area of the video frame (e.g., MTM(k)=1), spatial motion vector processing module 78 may assign the corresponding sub-block motion vector from the sub-block motion vector field as the spatially-estimated motion vector for the processed sub-block.

In cases where spatial motion analysis module 76 determines that the currently processed sub-block is an "unsure case" (e.g., MTM(k)=0), spatial motion vector processing module 78 may assign the corresponding block motion vector from the block motion vector field as the spatially-estimated motion vector for the processed sub-block.

In cases where spatial motion analysis module 76 determines that the currently processed sub-block occupies a motion transition area of the video frame (e.g., MTM(k)=2), spatial motion vector processing module 78 performs the true motion selection procedure described herein to determine which of the block motion vector or the sub-block motion to select for the spatially-estimated motion vector.

According to the true motion selection procedure, spatial motion vector processing module 78 may select a motion vector for the currently processed sub-block, $b_k$, based on which motion vector has a higher correlation with motion vectors corresponding to neighboring sub-blocks. In other words, spatial motion vector processing module 78 may determine whether the major motion (i.e, $v_B^*$) or the sub-motion (i.e., $v_{b_k}^*$) has higher correlation to the neighboring motion vectors. In some examples, spatial motion vector processing module 78 may use only those neighboring motion vectors that are fixed motion vectors for the correlation calculation. A neighboring fixed motion vector may refer to a neighboring motion vector that is a neighboring causal motion vector (e.g., a motion vector that has already been calculated) or to a neighboring motion vector that does not occupy a motion transition area (e.g., MTM(k)≠2). In some examples, spatial motion vector processing module 78 calculates an individual normalized motion distance for the major motion (i.e., block motion vector) and the sub-block motion (i.e., sub-block motion vector) and compares which motions can better fit the surrounding motion distribution.

Figure 8:
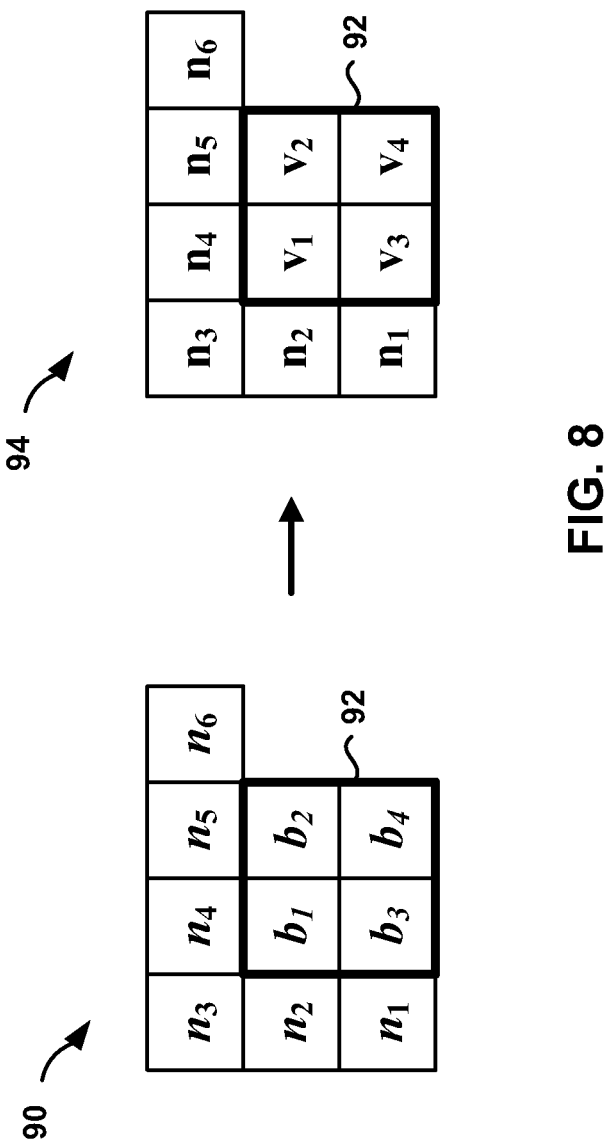
FIG. 8 is a conceptual diagram illustrating an example surrounding motion vector distribution that may be used in a motion selection procedure according to this disclosure.

FIG. 8 is a conceptual diagram illustrating an example surrounding motion vector distribution that may be used in the true motion selection procedure of this disclosure. FIG. 8 includes a chart 90 that illustrates the naming of sub-blocks for video block 92 and additional sub-blocks. FIG. 8 also includes a chart 94 that illustrates the naming of corresponding spatially-estimated motion vectors for video block 92 and the additional sub-blocks. As shown in FIG. 8, video block B may be subdivided into sub-blocks $b_1$, $b_2$, $b_3$, and $b_4$ with corresponding motion vectors $v_1$, $v_2$, $v_3$, and $v_4$. The additional sub-blocks may be designated as $n_1$, $n_2$, $n_3$, $n_4$, $n_5$, and $n_6$ with corresponding motion vectors $n_1$, $n_2$, $n_3$, $n_4$, $n_5$, and $n_6$.

As depicted in FIG. 8, the additional sub-blocks include sub-blocks adjacent to the left side of the video block (e.g., $n_1$, $n_2$), sub-blocks adjacent to the top side of the video block (e.g., $n_4$, $n_5$), a sub-block located diagonally from the top-left corner of the video block (e.g., $n_3$), a sub-block located diagonally from the top-right corner of the video block (e.g., $n_6$). Although the charts in FIG. 8 illustrate six neighboring sub-blocks for use within the true motion selection technique described herein, in other examples, the same or a different number of neighboring sub-blocks may be used in the same or different configurations.

For each video block, spatial motion vector processing module 78 may traverse the individual sub-blocks in a specific order. In some examples, the order may correspond to raster scan order. For example, spatial motion vector processing module 78 may process the sub-blocks such that $b_1$ is the first processed sub-block, $b_2$ is the second processed sub-block, $b_3$ is the third processed sub-block, and $b_4$ is the fourth and last processed sub-block. In examples where the video block includes additional sub-blocks, a similar raster scan ordering may be utilized.

For a currently processed motion vector, a neighboring motion vector may refer to a motion vector that corresponds to a neighboring sub-block. In some example, a neighboring sub-block may be any sub-block that shares a side or a corner with a currently-processed sub-block. In some examples, each sub-block may have up to eight possible neighboring motion vectors. However, in some examples, motion vector processing module 78 may use only a subset of the possible neighboring motion vectors as the candidate neighboring motion vectors for further processing. For example, in FIG. 8, only motion vectors within the currently-processed video block and the previously-processed video blocks are considered as candidate neighboring motion vectors. In other examples, however, a different number or configuration of neighboring motion vectors may be used as candidate motion vectors.

In order to determine the candidate neighboring motion vectors for a given sub-block, spatial motion vector processing module 78 may apply a motion selection mask that corresponds to the orientation of a currently-processed sub-block within a given video block. The motion selections masks may be used to identify particular neighboring motion vectors that may be taken into consideration for a correlation calculation.

Figure 9:
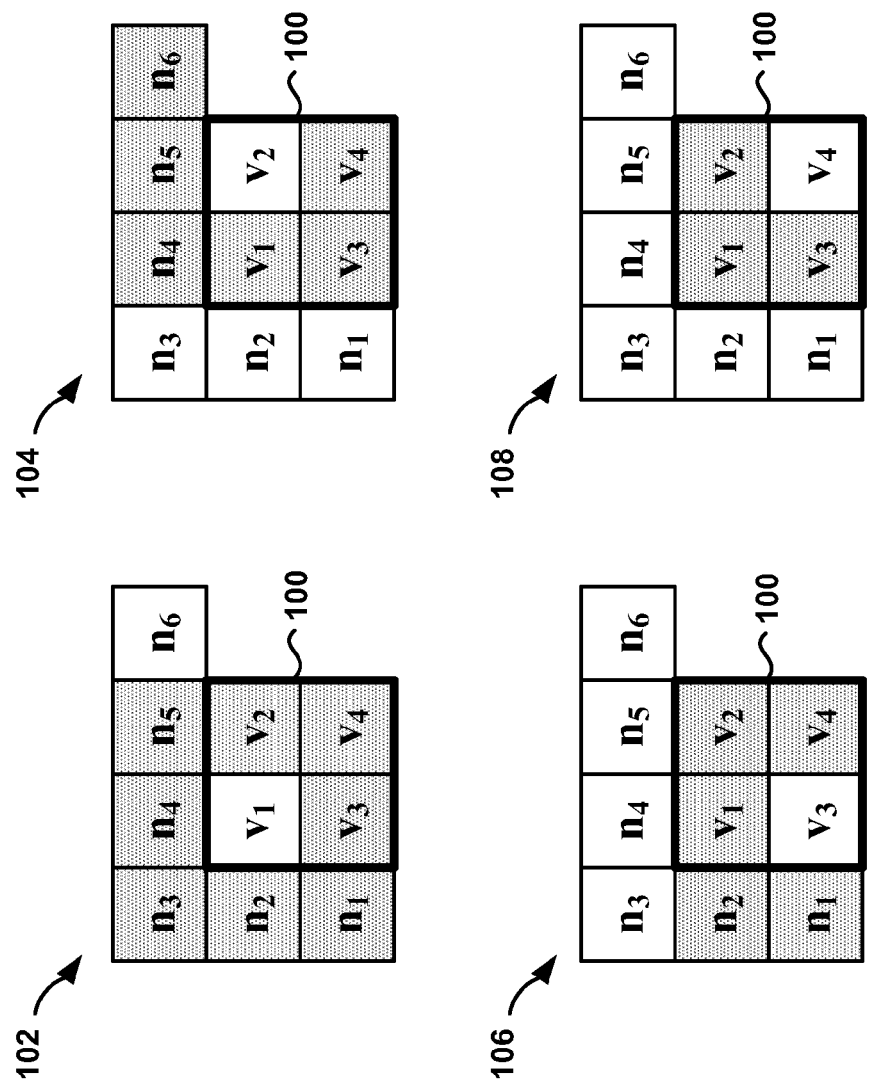
FIG. 9 is a conceptual diagram illustrating a set of motion selection masks according to this disclosure.

FIG. 9 is a conceptual diagram illustrating a set of motion selection masks that be defined for each of the sub-blocks within a processed video block 100. FIG. 9 includes charts 102, 104, 106, and 108 illustrating motion selection masks for sub-blocks $b_1$, $b_2$, $b_3$, and $b_4$ respectively. Chart 102 illustrates a motion selection mask for sub-block $b_1$, which includes the following motion vectors: $\{n_1, n_2, n_3, n_4, n_5, v_2, v_3, v_4\}$. Chart 104 illustrates a motion selection mask for sub-block $b_2$, which includes the following motion vectors: $\{n_4, n_5, n_6, v_1, v_3, v_4\}$. Chart 106 illustrates a motion selection mask for sub-block $b_3$, which includes the following motion vectors: $\{n_1, n_2, v_1, v_2, v_4\}$. Chart 108 illustrates a motion selection mask for sub-block $b_4$, which includes the following motion vectors: $\{v_1, v_2, v_3\}$. The motion vectors contained within the motion selection masks may be identified as candidate neighboring motion vectors. For example, for sub-block $b_1$, the candidate neighboring motion vectors include $\{n_1, n_2, n_3, n_4, n_5, v_2, v_3, v_4\}$.

With these selection masks, a motion set for the correlation calculation at each sub-block, $b_k$ can be obtained based on the combination of selection masks and the current process situation for $\{v_1, v_2, v_3, v_4\}$. For example, spatial motion vector processing module 78 may select a subset of the candidate neighboring motion vectors for a given sub-block for use within the motion set corresponding to the sub-block. In some examples, spatial motion vector processing module 78 may select only candidate neighboring motion vectors that fall within at least one of the following categories: (1) candidate motion vectors associated with sub-blocks that are not located within the currently-processed video block (i.e., causal motion vectors; e.g., $n_1$, $n_2$, $n_3$, $n_4$, $n_5$, $n_6$); and (2) fixed candidate motion vectors associated with sub-blocks that are located within the currently processed video block (e.g., $v_1$, $v_2$, $v_3$, $v_4$). In such examples, a fixed motion vector may refer to a motion vector that falls within at least one of the following categories: (1) a motion vector that does not lie within a motion transition area of the video frame (i.e., MTM(k)≠2); and (2) a motion vector that has already been processed. The selected motion vectors form the motion vector set (i.e, $V_{set,k}$) for the currently-processed sub-block $b_k$.

For example, consider a case where sub-block $b_3$ is the currently-processed sub-block, and the spatial motion transition mask for the major video block containing sub-block $b_3$ is MTM(k)={2, 1, 2, 0}. Since the spatial motion transition mask values for $b_1$ and $b_3$ are equal to a value of two, $v_1$ and $v_3$ are the only motion vectors for which a further check of local distance variations (i.e., spatial motion vector processing) needs to take place. Because a motion transition mask value of two indicates that the sub-block occupies a motion transition area, this example may be used to describe a video block having a motion boundary in a vertical direction. Spatial motion vector processing module 78 may then obtain the motion set for $v_3$ (i.e, $V_{set,3}$), which includes the following motion vectors: $\{n_1, n_2, v_1, v_2, v_4\}$. In this motion vector set, $\{n_1, n_2\}$ are selected because they are causal well-established motion vectors, $v_1$ is selected because it has been examined previously in the selection process, and $\{v_2, v_4\}$ are selected because they are not located on the motion boundary area.

Spatial motion vector processing module 78 may obtain the normalized motion distance for the major motion (i.e., $d(v_{B_k}^*)$) and the normalized motion distance for the sub-motions (i.e., $d(v_{b_k}^*)$) as follows:

$$d(v_{B_k}^*) = \frac{\sum_{v \in V_{set,k}} \|v_{B_k}^* - v\|_2}{E\left(\sum_{v \in V_{set,k}} \|v\|_2 + \|v_{B_k}^*\|_2\right)} \quad (5)$$

$$d(v_{b_k}^*) = \frac{\sum_{v \in V_{set,k}} \|v_{b_k}^* - v\|_2}{E\left(\sum_{v \in V_{set,k}} \|v\|_2 + \|v_{b_k}^*\|_2\right)}$$

where $\|\bullet\|$ represents the Euclidean norm or Euclidean distance applied to the expression contained within the brackets, $E(\bullet)$ is the expected value of the expression contained within the brackets, $V_{set,k}$ is the motion set for sub-block $b_k$, $v_{B_k}^*$ is the spatially-estimated block motion vector for sub-block $b_k$, $v_{b_k}^*$ is the spatially-estimated sub-block motion vector for sub-block $b_k$, $v$ is a spatially-estimated motion vector contained within the motion set, $\|v_{B_k}^* - v\|_2$ is the motion distance between $v_{B_k}^*$ and $v$, $\|v_{b_k}^* - v\|_2$ is the motion distance between $v_{b_k}^*$ and $v$, $\|v_{B_k}^*\|_2$ is the motion distance from $v_{B_k}^*$ to the origin, $\|v_{b_k}^*\|_2$ is the motion distance from $v_{b_k}^*$ to the origin, and $\|v\|_2$ is the motion distance from $v$ to the origin. It should be noted that the summation term in the denominator for $d(v_{B_k}^*)$ is $(\|v\|_2 + \|v_{B_k}^*\|_2)$ and that the summation term in the denominator for $d(v_{b_k}^*)$ is $(\|v\|_2 + \|v_{b_k}^*\|_2)$.

Spatial motion vector processing module 78 may select one of the block motion vector or the sub-block motion vector based on the normalized motion distances as follows:

$$\begin{cases} v_k = v_{b_k}^*, \text{ if } d(v_{b_k}^*) \leq d(v_{B_k}^*) \\ v_k = v_{B_k}^*, \text{ if } d(v_{B_k}^*) < d(v_{b_k}^*). \end{cases} \quad (6)$$

According to equation (6), if the normalized motion distance for the minor motion is less than or equal to the normalized distance for the major motion, then the sub-block motion vector is selected as the spatially-estimated motion vector for the sub-block. Otherwise, if the normalized motion distance from the major motion is less than the normalized motion distance for the minor motion, the block motion vector is selected as the spatially-estimated motion vector for the sub-block.

The normalized motion distance for the major motion may be representative of the correlation between the block motion vector and neighboring spatially-estimated motion vectors. The normalized motion distance for the minor motion may be representative of the correlation between the sub-block motion vector and neighboring spatially-estimated motion vectors. When the normalized motion distance for the minor motion is less than the normalized distance for the major motion, the sub-block motion vector has a higher correlation with the spatially-estimated motion vectors of neighboring sub-blocks compared to the block motion vector. Therefore, the sub-block motion vector, as opposed to the block motion vector may be regarded as a better representative of the true motion of objects within the video frame.

Similarly, when the normalized motion distance for the major motion is less than the normalized distance for the minor motion, the block motion vector has a higher correlation with the spatially-estimated motion vectors of neighboring sub-blocks compared to the sub-block motion vector. Therefore, the block motion vector, as opposed to the sub-block motion vector, may be regarded as a better representative of the true motion of objects within the video frame. In this manner, spatial motion vector processing module 78 may generate spatially-estimated motion vectors that better represent the true motion within a video frame compared to motion vectors generated by a conventional SAD motion search.

In some examples, spatial motion vector processing module 78 may use other techniques for selecting the appropriate motion vector as the spatially-estimated motion vector. For example, motion estimation may tend to randomly distribute in the areas with smooth contents. Such a phenomenon may become more obvious as the block size is reduced in the motion estimation process. Therefore, in some examples, spatial motion vector processing module 78 may skip the true motion processing of video blocks that have relatively smooth contents, and select the block motion vector for such blocks. Therefore, even though possible motion transitions may exist (i.e., MTM(k)=2) for a given video block or sub-block, in such examples, spatial motion vector processing module 78 need not necessarily calculate the normalized motion distances for such video blocks. A threshold, $TH_{replace}$, may be set to indicate the level of smoothness within a video block. In such examples, Equation (6) may be modified as follows:

$$\begin{cases} v_k = v_{b_k}^*, \text{ if } d(v_{b_k}^*) \leq d(v_{B_k}^*) \text{ and } SAD(v_{B_k}^*) \geq TH_{replace}, \\ v_k = v_{B_k}^*, \text{ if otherwise.} \end{cases} \quad (7)$$

According to equation (7), the sub-block motion vector is selected only when both of the following conditions are satisfied: (1) the minor motion is less than or equal to the major motion; and (2) the sum-of-absolute difference for the block motion vector is greater than or equal to a replace threshold. Thus, for video blocks with very smooth contents, the cost function will evaluate to a value greater than the replace threshold, resulting in the block motion vector being selected. In this manner, the normalized motion distance values need not be calculated for certain video blocks. In some examples, the replace threshold may be set to a value of 150 for an 8×8 block size.

For a given video block, if the motion transition occurs merely in sub-block $b_4$ (i.e., the motion boundary distribute with an angle of 45 degrees), the analysis of surrounding motion correlation information may not be as helpful for the selection process. In such cases, even $v_{b_4}^*$ is the most suitable motion for sub-block $b_4$, merely relying on the motion correlation analysis cannot assist us to select the correct motion.

Therefore, spatial motion vector processing module 78 may use another distortion metric to further examine $v_4$ if $b_4$ has possible motion transitions (MTM(4)=2) and $v_4$ has not been replaced yet by $v_{b_4}^*$. This examination can be described as follows:

$$\begin{cases} v_k = v_{b_k}^*, & \text{if } \left(SAD(v_{B_k}^*) - SAD(v_{b_k}^*)\right) \geq TH_{drop} \\ & \text{and } SAD(v_{B_k}^*) \geq TH_{replace}, \\ v_k = v_{B_k}^*, & \text{otherwise}, \end{cases} \quad (8)$$

where $TH_{drop}$ is a drop threshold, $TH_{replace}$ is a replace threshold. In some examples, $TH_{drop}$ may be defined as $(SAD(v_{B_k}^*) + SAD(v_{b_k}^*))/2$, and $TH_{replace}$ may be defined as 10× (size of sub-block)$^2$. In such examples, if the sub-block size is 8×8, $TH_{replace}$=640. Thus, in some examples, the replace threshold recited in equation (8) may be a different replace threshold than that which is recited in equation (7). In particular, $TH_{replace}$ recited in equation (8) may, in some examples, be set to a value that is greater than $TH_{replace}$ recited equation (7). In such examples, the replace threshold for equation (8) may be relatively stricter to ensure that the SAD values for $v_B^*$ are very high.

In some examples, the norm$_2$ calculation for the motion distance calculation in equation (5) may be approximated by employing an absolute difference calculation for the x and y components of the motion vectors and a look-up table. In particular, for two motion vectors, $v_1$ and $v_2$, the scale distance can be defined as follows:

$$\text{Mag}_{scale} = \text{Mag}_{x,scale} + \text{Mag}_{y,scale} = |v_{x,1} - v_{x,2}| + |v_{y,1} - v_{y,2}| \quad (9)$$

where $v_1 = (v_{x,1}, v_{y,1})$ and $v_2 = (v_{x,2}, v_{y,2})$, $\text{Mag}_{scale}$ represents the scale distance, $\text{Mag}_{x,scale}$ represents the x-component of the scale distance, and $\text{Mag}_{y,scale}$ is the y-component of the scale distance.

According to equation (9), the x-component of the scale distance may be determined by calculating the absolute difference of the x-components for $v_1$ and $v_2$. Similarly, the y-component of the scale distance may be determined by calculating the absolute difference of the y-components for $v_1$ and $v_2$. The x- and y-components may be summed together to obtain $\text{Mag}_{scale}$.

A maximum magnitude $\text{Mag}_{max}$ may be defined such that $\text{Mag}_{max} = \text{Mag}_{scale}$. Then, the actual motion vector magnitude distance, Mag, may vary within the range defined as $[(\text{Mag}_{max}/\sqrt{2}) \leq \text{Mag} \leq \text{Mag}_{max}]$. The variation statistics between the scale distance and their actual magnitude distance may be gathered to obtain a variation statistics table as illustrated in Table 1 below:

TABLE 1

| $\text{Mag}_{scale}$ Combinations | Actual Magnitude | Approximate Magnitude |
|---|---|---|
| ($\text{Mag}_{x,scale}$ + $\text{Mag}_{y,scale}$) | | |
| $0 + \text{Mag}_{scale}$ | $\text{Mag}_{max}$ | |
| $0.125\,\text{Mag}_{scale} + 0.875\,\text{Mag}_{scale}$ | $0.884 \times \text{Mag}_{max}$ | $0.942 \times \text{Mag}_{max}$ |
| $0.25\,\text{Mag}_{scale} + 0.75\,\text{Mag}_{scale}$ | $0.79 \times \text{Mag}_{max}$ | $0.837 \times \text{Mag}_{max}$ |
| $0.5\,\text{Mag}_{scale} + 0.5\,\text{Mag}_{scale}$ | $0.71 \times \text{Mag}_{max}$ | $0.75 \times \text{Mag}_{max}$ |

The left-hand column of Table 1 illustrates the combination of scale differences for the x- and y-components of $v_1$ and $v_2$. The x-component for the scale difference is on the left of the plus sign and the y-component for the scale difference is on the right of the plus sign. The x- and y-components are written as a ratio multiplied by $\text{Mag}_{scale}$. The center column illustrates the actual magnitude value (i.e., the norm$_2$ value) for specific combinations of x- and y-components. The actual magnitude value is written as a ratio or factor multiplied by $\text{Mag}_{max}$. The right-hand column illustrates ratios that may be used to approximate the actual magnitudes when one of scale differences is between the specific scale differences illustrated in the center column.

In Table 1, the 0.884 factor for the Actual Magnitude is calculated according to the following expression: $\sqrt{0.125^2 + 0.875^2}$; the 0.79 factor is calculated according to the following expression: $\sqrt{0.25^2 + 0.75^2}$; and the 0.71 factor is calculated according to the following expression: $\sqrt{0.5^2 + 0.5^2}$. If any of the $\text{Mag}_{scale}$ combinations falls in between the two values defined in the left column of Table 1, the magnitude can be found by using the Approximate Magnitude expression in the right hand column that is situated between the two respective values. The factors contained in the Approximate Magnitude column are the average of the two Actual Magnitude factors. For example, 0.942 is obtained by taking the average of 1 and 0.884, and 0.837 is obtained by taking the average of 0.884 and 0.79.

The actual magnitude distances may fall into specific ranges as one of scale distances drops by ratio 2. In one example, the ranges may be classified into four different levels, e.g., {1, 15/16, 7/8, 3/4}. Since each of the denominators are a power of two, the division "/" can be replaced by right shift ">>". Therefore, in this example, 0.875 (7/8) replaces the 0.837 ratio in Table 1, and 0.9375 (15/16) replaces the 0.942 ratio in Table 1. Thus, instead of Table 1, some examples may use Table 2 to approximate the norm$_2$ calculation:

TABLE 2

| $\text{Mag}_{scale}$ Combinations | Actual Magnitude | Approximate Magnitude |
|---|---|---|
| ($\text{Mag}_{x,scale}$ + $\text{Mag}_{y,scale}$) | | |
| $0 + \text{Mag}_{scale}$ | $\text{Mag}_{max}$ | |
| $0.125\,\text{Mag}_{scale} + 0.875$ | $0.884 \times \text{Mag}_{max}$ | $(15 \times \text{Mag}_{max}) >> 4$ |
| $\text{Mag}_{scale}$ | | |
| $0.25\,\text{Mag}_{scale} + 0.75\,\text{Mag}_{scale}$ | $0.79 \times \text{Mag}_{max}$ | $(7 \times \text{Mag}_{max}) >> 3$ |
| $0.5\,\text{Mag}_{scale} + 0.5\,\text{Mag}_{scale}$ | $0.71 \times \text{Mag}_{max}$ | $(3 \times \text{Mag}_{max}) >> 1$ |

Consider an example where $\text{Mag}_{x,scale} = 17$ and $\text{Mag}_{y,scale} = 3$. In this example, $\text{Mag}_{max} = 20$. Since the value of $\text{Mag}_{y,scale}/\text{Mag}_{max}$ is 0.15 (between [0.125, 0.25]), according to Table 2, the approximate magnitude=$(7 \times \text{Mag}_{max}) >> 3 = (7*20) >> 3 = 17.5$ Thus, in equation (5), the approximation procedure described with respect to equation (9), Table 1 and/or Table 2 may be used to determine the motion distances rather than actual calculation of a Euclidean difference. In this manner, normalized motion distances may be obtained without the need to perform square root calculations and/or norm calculations.

In some examples, the conditions in equation (6) may be rewritten as:

$$\begin{cases} v_k = v_{b_k}^*, \text{if} & \dfrac{\left(\sum_{v \in V-set,k} \|v_{b_k}^* - v\|_2\right) \cdot E\left(\sum_{v \in V_{set,k}} \|v\|_2 + \|v_{B_k}^*\|_2\right)}{\left(\sum_{v \in V_{set,k}} \|v_{B_k}^* - v\|_2\right) \cdot E\left(\sum_{v \in V_{set,k}} \|v\|_2 + \|v_{b_k}^*\|_2\right)} \leq \\ v_k = v_{B_k}^*, \text{otherwise.} \end{cases} \quad (10)$$

As shown in equation (10), the relationship between the major and minor motions may be obtained without the division that is required when using equation (5).

Although the true motion estimation techniques described herein are presented based on two different motion resolutions (e.g., block size "16×16→8×8"), the techniques may be applied to any combination of motion resolutions including combinations that have more than two motion resolutions. For example, the techniques can be applied to motion vector field resolutions corresponding to the following block sizes: "32×32→16×16→8×8" or "16×16→8×8→4×4".

In some examples, temporal motion analysis module 82 and temporal motion vector refinement module 84 may operate with a process window that is 3×3 (i.e., a process window having a length and a width of three sub-blocks) with the currently-processed sub-block motion vector being the center sub-block. In other words, the temporal motion vector refinement techniques described herein may, in some examples, require spatially-estimated motion vectors for the eight sub-blocks that surround a currently-processed sub-block. If temporal motion analysis module 82 were to immediately process a spatially-estimated motion vector upon generation by spatial motion analysis module 76 and/or spatial motion vector processing module 78, some of the spatial motion vectors for temporal refinement may not yet be available. A process window shift may be used in order to ensure that temporal motion analysis 82 and temporal motion vector refinement module 84 have the motion vectors needed for further processing.

Window shift module 80 shifts the motion vector processing window such that temporal motion vector refinement may occur simultaneously with spatial motion vector processing. In some examples, window shift module 80 may shift the process window one sub-block horizontally and one sub-block vertically. In other words, window shift module 80 may shift the window diagonally one sub-block.

Figure 10:
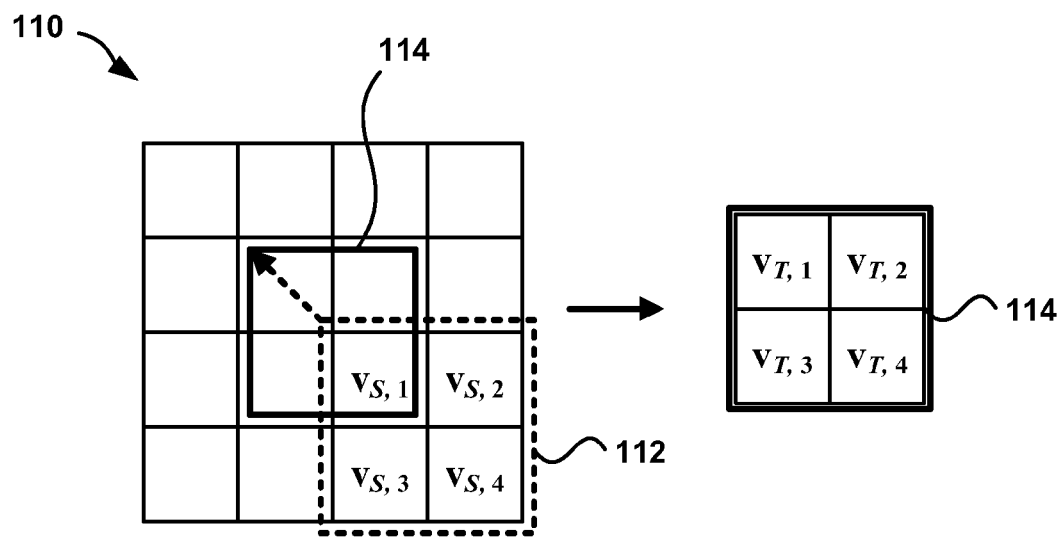
FIG. 10 is a conceptual diagram illustrating an example process window shift according to this disclosure.

FIG. 10 is a conceptual diagram illustrating an example process window shift. FIG. 10 includes a grid of video sub-blocks 110, a spatial processing window 112, and a temporal processing window 114. As shown in FIG. 10, the subscript letter 'S' is used to denote the latest spatially-estimated motion vectors after the spatial motion vector processing stage. The subscript letter 'T' is used to denote the motion vectors for the temporal bidirectional motion vector refinement process that occurs immediately after the reception of the latest spatially-estimated motion vectors.

Consider an example where each video block includes four sub-blocks. Assuming the process window for spatial motion analysis module 76 and spatial motion vector processing module 78 has just finished generating spatially-estimated motion vectors for video block B(i, j), which includes sub-blocks $b_{S,k}(i, j)$, the temporal motion vector refinement process window may be defined as follows $b_{T,k}(i-0.5, j-0.5)$ where:

$$b_{T,1}(i-0.5, j-0.5) = b_{S,4}(i-1, j-1)$$

$$b_{T,2}(i-0.5, j-0.5) = b_{S,3}(i, j-1)$$

$$b_{T,3}(i-0.5, j-0.5) = b_{S,2}(i-1, j)$$

$$b_{T,4}(i-0.5, j-0.5) = b_{S,1}(i, j). \quad (11)$$

Next, a temporal bidirectional motion refinement process with temporal and spatial considerations is described. The temporal bidirectional motion refinement process ensures the temporal quality of the motion vector field. In some examples, the temporal motion refinement process may be completed simultaneously with the spatial motion analysis and processing of the estimated motion vector fields. That is, unlike other conventional motion vector processing methods that first generate an estimated motion vector field and then revisit the motion vector field after to modify the motion vector field, the spatial and temporal motion processing techniques described herein may be performed in one-pass. As used herein, $MVF_S$ and $MVF_T$ may refer to motion vector fields without and with temporal refinement respectively.

Temporal motion analysis module 82 generates a temporal motion transition mask based on a spatially-estimated motion vector field for a plurality of video sub-blocks. In addition, temporal motion analysis module 82 may generate a temporally-refined motion vector field based on the temporal motion analysis. In some examples, the temporally-estimated motion vector field may be a partially-populated temporal motion vector field. In other words, in some examples, only a subset of the sub-blocks may have temporally-refined motion vectors after processing by temporal motion analysis module. Temporal motion vector refinement module 84 applies the temporal motion transition mask to the temporally-refined motion vector field to generate a fully-populated temporally-refined motion vector field. Together, temporal motion analysis module 82 and temporal motion vector refinement module 84 provide a set of temporally-refined motion vectors that improve the temporal quality of the spatially-estimated motion vectors.

Temporal motion analysis module 82 determines if a currently-processed motion vector should receive temporal bidirectional refinement processing. This determination is made because spatially-estimated motion vectors ($v_S^*$) may be similar to the corresponding temporally-refined motion vectors ($v_T^*$) in many cases. However, if a spatially-estimated motion vector field is used for a temporal application, such as, e.g., temporal frame interpolation, temporally-refined motion vectors may be better suited to represent the motion flow. Thus, in some examples, temporal motion analysis module 82 may determine that a currently-processed motion vector should receive temporal bidirectional refinement processing when the sub-block is located in a motion boundary area. In some examples, the analysis for determining whether a sub-block is located in a motion boundary area may be different from the process used by spatial motion analysis module 76.

Figure 11:
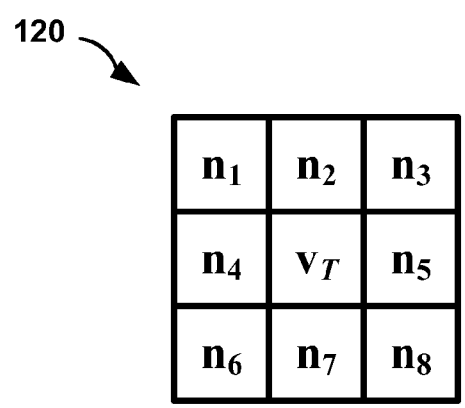
FIG. 11 is a conceptual diagram illustrating an example surrounding motion vector distribution that may be used in the temporal analysis procedure according to this disclosure.

FIG. 11 is a conceptual diagram illustrating a grid of sub-blocks 120. Grid 120 includes a currently-processed sub-block, $v_T$, and neighboring sub-blocks $\{n_1, n_2, n_3, n_4, n_5, n_6, n_7, n_8\}$. The neighboring sub-blocks used for temporal motion analysis and processing may, in some examples, be different from the neighboring sub-blocks used for spatial motion vector processing. For example, the neighboring sub-blocks for temporal analysis may include all sub-blocks that surround the currently-processed sub-block. Surrounding sub-blocks may include sub-blocks that share an edge or corner with the currently-processed sub-block.

Temporal motion analysis module 82 may, in some examples, generate a temporal motion transition mask (MTM) for each sub-block, $b_k$, within a video block, B, as follows:

$$\begin{cases} MTM_T(k) = 1, \text{ if } \|v_T - n_p\|_2 > TH_{mt1} \\ MTM_T(k) = 0, \text{ otherwise} \end{cases} \quad (12)$$

where $p=\{1, 2, \ldots, 8\}$ $v_T$ represents a currently-processed sub-block motion vector, $n_P$ represents a neighboring sub-block motion vector, $\|\bullet\|_2$ represents the Euclidean norm or Euclidean distance applied to the expression contained within the brackets, $MTM_T(k)$ represents the motion transition mask value for sub-block $b_k$, $TH_{mt1}$ represents a first threshold. In some examples, $TH_{mt1}$ may be a threshold different from the threshold of equation (4).

In equation (12), the currently-processed and neighboring motion vector fields may be obtained from $MVF_T$, as opposed to $MVF_S$. In other words, the motion vectors used for equation (12) may be motion vectors that have been received from process window shift module 80.

According to equation (12), temporal motion vector refinement module 84 may determine a motion distance (e.g., $\|v_T-n_P\|_2$) between a currently-processed sub-block motion vector and a neighboring sub-block motion vector. Temporal motion vector refinement module 84 may continue to calculate motion distances with respect to different neighboring sub-blocks until the motion distance is greater than the threshold. If the motion distance is greater than the threshold for at least one neighboring sub-block, temporal motion vector refinement module 84 may assign a value of one to the temporal motion transition mask for the sub-block. Otherwise, if the motion distance is less than or equal to the threshold for all neighboring sub-blocks, temporal motion vector refinement module 84 may assign a value of one to the motion transition mask for the sub-block.

The threshold, $TH_{mt1}$, may be used to identify the first case (i.e., a motion transition area). In other words, the threshold may indicate a motion distance above which a video sub-block may be regarded as occupying a motion transition area for purposes of temporal processing. In such a case, a suitable motion vector for the sub-block may be selected from among the currently-processed sub-block and neighboring sub-blocks by performing a temporal bidirectional motion refinement process described in further detail later in this disclosure.

If all of the motion distances for neighboring sub-blocks are less than or equal to the threshold, the sub-block may be regarded as not occupying a motion transition area for purposes of temporal processing. In other words, the currently-processed motion vector can be regarded as having motion similar to that of neighboring motion vectors. In such a case, the spatially-estimated motion vector for the sub-block may be selected as the temporally-refined motion vector for the sub-block.

In some examples, the calculations in equation (12) to determine possible motion boundaries may be implemented as a scale difference according to the following expression:

$$\begin{cases} MTM_T(k) = 1, \text{ if } |v_{T,k,x} - n_{p,x}| + |v_{T,k,y} - n_{p,y}| > TH_{mt1} \\ MTM_T(k) = 0, \text{ otherwise} \end{cases} \quad (13)$$

where $v_{T,k}=(v_{T,k,x},v_{T,k,y})$, $n_p=(n_{p,x},n_{p,y})$, and $|\bullet|$ represents an absolute value operator. Thus, in equation (13) absolute scale differences may be used to determine the motion distance rather than Euclidean differences. In this manner, a motion transition mask may be obtained without the need to perform square root calculations.

Temporal motion vector refinement module 84 generates a temporally-refined motion vector field based on the temporally-estimated motion vector field and the temporal motion transition mask. For sub-block motion vectors that have been identified as occupying a motion boundary, temporal motion vector refinement module 84 compares the bidirectional prediction difference (BPD) to that of neighboring motion vectors to determine which of the neighboring motion vectors minimizes a cost function. In some examples, the motion vector that minimizes the cost function may correspond to the motion vector that has the best temporal motion quality.

For each sub-block, temporal motion vector refinement module 84 may select a motion vector candidate set $V_{set}$. In some examples, the motion vector candidate set may be composed of the center motion vector $v_T$ (i.e., the currently-processed motion vector) and eight neighboring motion vectors, $\{n_1, n_2, n_3, n_4, n_5, n_6, n_7, n_8\}$. The motion vector from the candidate set that minimizes a cost function may be selected as the temporally-refined motion vector, $v_T^*$. In some examples, the cost function may be a BPD distortion error.

Temporal motion vector refinement module 84 may determine the sum of absolute bidirectional prediction difference for each block as follows:

$$BPD(v) = \sum_{x,y \in b} \left| f_{t-1}\left(x + \frac{v_x}{2}, y + \frac{v_y}{2}\right) - f_t\left(x - \frac{v_x}{2}, y - \frac{v_y}{2}\right) \right| \quad (14)$$

where b represents a currently-processed sub-block, x and y are the indices within b, $v=[v_x, v_y]$ represents a candidate sub-block motion vector within candidate set $V_{set}$, $v_x$ represents the x-component of the motion vector, $v_y$ represents the y-component of motion vector, $f_t(x, y)$ represents a pixel value (e.g., a luminance value, a chrominance value, or a combination of luminance and chrominance values) for a pixel located at location (x, y) in frame $f_t$.

In order to calculate the BPD, temporal motion vector refinement module 84 may determine a forward motion vector and a backward motion vector for the candidate motion vector. In one example, the forward and backward motion vectors may be equal to each other and obtained by dividing the x- and y-components of the candidate motion vector by a factor of two. Temporal motion vector refinement 84 generates a BPD value for a video sub-block and candidate motion vector combination based on the forward and backward motion vectors. For example, temporal motion vector refinement module 84 may calculate pixel values for a current frame (i.e., $f_t$) based on the forward motion vector, and pixel values for a previous frame (i.e., $f_{t-1}$) based on the backward motion vector. Temporal motion vector refinement module 84 may then calculate a sum of absolute differences between the current frame pixel values and the previous frame pixels values according to equation (14).

Temporal motion vector refinement module 84 may obtain the temporally-refined motion vector (i.e., $v_T^*$) for a given sub-block can be obtained as follows:

$$v_T^* = \min_{v \in V_{set}} (D_{BPD}(v)) \quad (15)$$

$$D_{BPD}(v) = BPD(v) + w_1 \cdot \|v - v_{pred}\|_2 + w_2 \|v - v_T\|_2$$

where $D_{BPD}(v)$ represents the distortion metric for a candidate motion vector v, $V_{set}$ is the candidate motion vector set, BPD(v) represents the bidirectional prediction difference for the candidate motion vector, $w_1$ represents a first weighting factor, $w_2$ represents a second weighting factor, $v_{pred}$ represents a predicted motion vector, $v_T$ represents the currently-processed motion vector, $\|v-v_{pred}\|_2$ represents the motion distance between v and $v_{pred}$, and $\|v-v_T\|_2$ represents the motion distance between v and $v_T$, and $\|\bullet\|_2$ represents the Euclidean norm or Euclidean distance applied to the expression contained within the brackets.

In equation (15), the first weighting factor, $w_1$, may indicate the degree to which motion vectors near the predicted motion vector (i.e., $v_{pred}$) are favored. In general, the higher the weighting factor, the greater degree to which motion vectors near the predicted motion vector are favored. A zero weighting factor indicates that all motion vectors are treated equally regardless of their distance from the predicted motion vector.

The second weighting factor, $w_2$, may indicate the degree to which motion vectors near the currently-processed motion vector (i.e., $V_T$) are favored. In general, the higher the weighting factor, the greater degree to which motion vectors are favored that are near the currently-processed motion vector. A zero weighting factor indicates that all motion vectors are treated equally regardless of their distance from the currently-processed motion vector.

In some examples, temporal motion vector refinement module 84 may initialize the first and second weighting factors each to a particular value (e.g., a value of 10 for an 8×8 sub-block size). In such examples, temporal motion vector refinement module 84 may, in some examples, change the second weighting factor (i.e., $w_2$) to a value of zero when at least one of an x- or y-component of $v_T$ is larger than twice the sub-block size (e.g., 16 for an 8×8 sub-block). For example, if $v_T=[20, 8]$, temporal motion vector refinement module 84 sets $w_2$ to a value of zero.

Temporal motion vector refinement module 84 may obtain the predicted motion vector by performing a vector median filter operation based on motion vectors within the local neighborhood. The vector median filter operation may be performed according to the following equation:

$$v_{pred} = \underset{v \in S_p}{\operatorname{argmax}} \sum_{m=i-1}^{m=i+1} \sum_{n=j-1}^{n=j+1} \|v - v_{m,n}\|_2 \quad (16)$$

where $S_p=\{v_T, n_1, n_2, \ldots, n_7, n_8\}$ represents the sample motion vector set for the vector median filter, v represents a motion vector selected from $S_p$, where $v_{i-1,j-1}=n_1$, $v_{i-1,j}=n_2$, $v_{i-1,j+1}=n_3$, $v_{i,j-1}=n_4$, $v_{i,j}=v_T$, $v_{i,j+1}=n_5$, $v_{i+1,j-1}=n_6$, $v_{i+1,j}=n_7$, $v_{i+1,j+1}=n_8$, and $\|\bullet\|_2$ represents the Euclidean norm or Euclidean distance applied to the expression contained within the brackets.

In some examples, the calculations in equation (15) to determine the distortion metric may be implemented as a scale difference according to the following expression:

$$D_{BPD,k}(v)=BPD_k(v)+w_1 \cdot (|v_x-v_{x,pred}|+|v_y-v_{y,pred}|)+w_2 \cdot (|v_x-v_{x,T,k}|+|v_y-v_{y,T,k}|) \quad (17)$$

where $v=(v_x, v_y)$, $v_{pred}=(v_{x,pred}, v_{y,pred})$, and $|\bullet|$ represents an absolute value operator. Thus, in equation (17) absolute scale differences may be used to determine the motion distance rather than Euclidean differences. In this manner, a motion transition mask may be obtained without the need to perform square root calculations.

In equation (16), a vector median filter operation is used to obtain the predicted motion vector, which is in turn used to calculate the distortion metric. The $\text{norm}_2$ calculation may, in some examples, be implemented using equation (9) and Table 1 as described above.

In some cases, more than one surrounding motion vector may be equally important to the temporally-refined motion vector. To account for such cases, equation (16) may be modified as follows:

$$\sum_{m=i-1}^{m=i+1} \sum_{n=j-1}^{n=j+1} \|v_{pred} - v_{m,n}\|_2 \leq \min_{v \in S_p} \left( \sum_{m=i-1}^{m=i+1} \sum_{n=j-1}^{n=j+1} \|v - v_{m,n}\|_2 \right) + e \quad (17)$$

where e is a tolerance factor. In some examples, e may be set to a value of two. According to equation (17), any motion vector whose motion distances are less than the minimum distance plus e will be selected as predicted motion vectors. If multiple motion vectors are selected as predicted motion vectors, the $v_{pred}$ value used for equation (15) may be equal to the mean value of all qualified predicted motion vectors.

Figure 12:
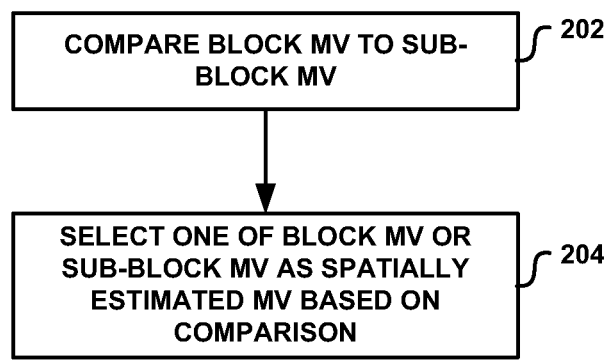
FIG. 12 is a flow diagram illustrating a spatial motion vector processing technique according to this disclosure.

FIG. 12 is a flow diagram illustrating a spatial motion vector processing technique according to this disclosure. The technique depicted in FIG. 12 may be applied to a motion vector field containing motion vectors for a plurality of video blocks and motion vectors for a plurality of video sub-blocks. True motion estimation module 64 compares a sub-block motion vector to a block motion vector (202). The video sub-block to which the sub-block motion vector corresponds may be a part of the video block to which the block motion vector corresponds. In some examples, the comparison may involve determining a motion distance between the block motion vector and the sub-block motion vector. The motion distance may, in some examples, correspond to the Euclidean distance or the Euclidean norm between the two motion vectors.

Based on the comparison, true motion estimation module 64 selects either the sub-block motion vector or the block motion vector as the spatially-estimated motion vector for the sub-block (204). The true motion estimation technique shown in FIG. 12 may be used to generate a spatially-estimated motion vector field for all or a portion of a video frame. The spatially-estimated motion vector field provides a motion vector field that utilizes motion vectors corresponding to different block sizes depending on whether a particular sub-block occupies a motion boundary within the video frame. By selecting different motion vectors based on motion transition within the video frame, a frame-rate up-conversion unit may have access to additional motion data for use in interpolation and/or frame insertion algorithms. In this manner, various artifacts and distortion caused by variances between conventional motion vectors and true motion may be reduced.

In some examples, the selection between the block motion vector and the sub-block motion vector may be based on a threshold. The threshold, in some examples, may generally indicate a motion distance below which the video sub-block may be regarded as occupying a non-motion transition area of the video frame. In such examples, if the motion distance is less than the threshold, the sub-block motion vector may be selected. On the contrary, if the motion distance is greater than the threshold, the block motion vector may be selected.

In additional examples, the threshold may generally indicate a motion distance above which the video sub-block may be regarded as occupying a motion transition area. In such examples, if the motion distance is less than the threshold, the sub-block motion vector may be selected. If the motion distance is greater than the threshold in such examples, a true motion selection algorithm may be performed to select either the block motion vector or the sub-block motion vector.

In additional examples, the selection between the block motion vector and the sub-block motion vector may be based on two different thresholds. A first threshold may generally indicate a motion distance above which the video sub-block may be regarded as occupying a motion transition area. A second threshold may generally indicate a motion distance below which the video sub-block may be regarded as occupying a non-motion transition area of the video frame. In such examples, the first threshold may be greater than the second threshold. If the motion distance is less than the second threshold, the sub-block motion vector may be selected. If the motion distance is greater than the second threshold, but less than the first threshold, the block motion vector may be selected. If the motion distance is greater than the first threshold, a true motion selection algorithm may be performed to select either the block motion vector or the sub-block motion vector.

Figure 13:
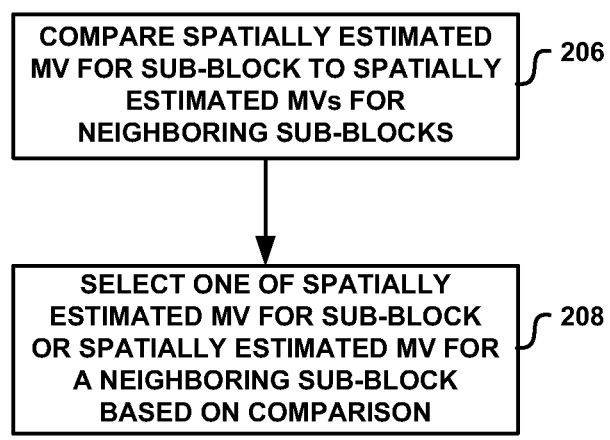
FIG. 13 is a flow diagram illustrating a temporal motion vector processing technique according to this disclosure.

FIG. 13 is a flow diagram illustrating a temporal motion vector processing technique according to this disclosure. True motion estimation module 64 compares a spatially-estimated motion vector for a processed sub-block to one or more spatially-estimated motion vectors associated with neighboring sub-blocks (206). In some examples, the neighboring sub-blocks may include all sub-blocks that surround the processed sub-block including any sub-blocks that are above, below, next to, or diagonal to the processed sub-block. In some examples, the comparison may involve determining a motion distance between the block motion vector and the sub-block motion vector. The motion distance may, in some examples, correspond to the Euclidean distance or the Euclidean norm between the two motion vectors.

True motion estimation module 64 selects either the spatially-estimated motion vector for the processed sub-block or a spatially-estimated motion vector for a neighboring sub-block based on the comparison (208). The true motion estimation technique shown in FIG. 13 may be used to generate a temporally-refined motion vector field for all or a portion of a video frame. The temporally-refined motion vector field provides a motion vector field that utilizes motion vectors corresponding to neighboring sub-blocks depending on which motion vector minimizes a cost function. By selecting different motion vectors based on motion transition within the video frame, a frame-rate up-conversion unit may have access to additional motion data for use in interpolation and/or frame insertion algorithms. In this manner, various artifacts and distortion caused by variances between conventional motion vectors and true motion may be reduced.

In some examples, the selection between the processed sub-block motion vector and the neighboring sub-block motion vectors may be based on a threshold. In such examples, the threshold may generally indicate a motion distance above which the processed sub-block may be regarded as occupying a motion boundary within the video frame. In some examples, true motion estimation module 64 may regard the processed sub-block as occupying a motion boundary when at least one of the motion distances between the processed sub-block and a neighboring sub-block is greater than the threshold.

In some examples, if the processed sub-block is regarded as occupying a motion boundary, then a temporal motion vector refinement technique may be used to select the appropriate sub-block motion vector. Otherwise, if the processed sub-block is not regarded as occupying a motion boundary, then the spatially-estimated motion vector for the sub-block may be selected as the temporally-refined motion vector for the sub-block.

Figure 14:
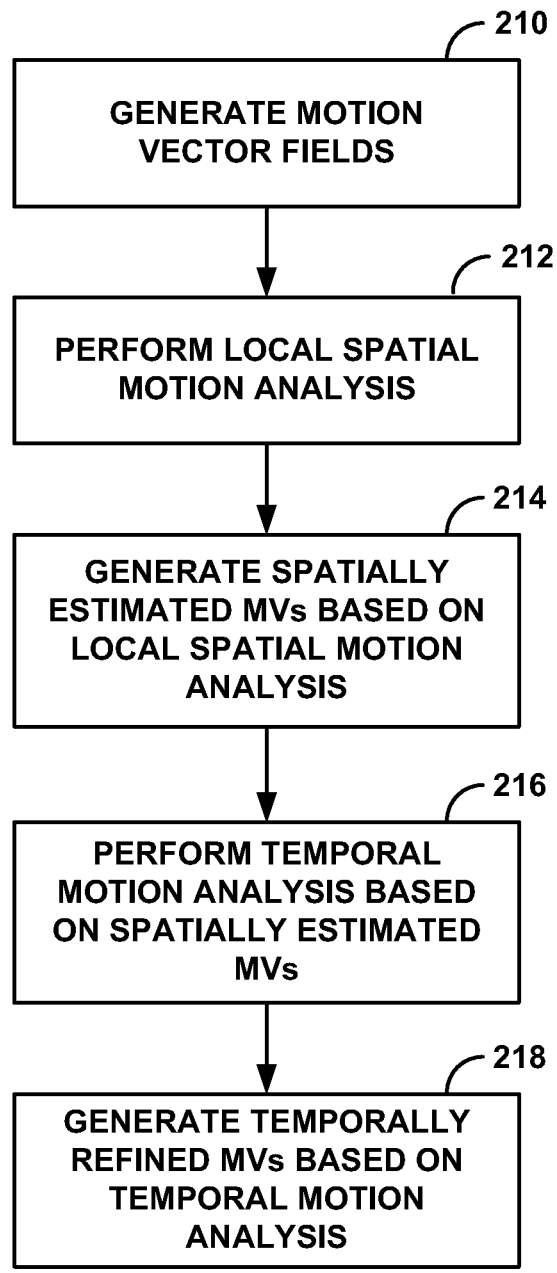
FIG. 14 is a flow diagram illustrating a motion estimation technique according to this disclosure.

FIG. 14 is a flow diagram illustrating a true motion estimation technique according to this disclosure. True motion estimation module 64 generates one or more motion vector fields (210). True motion estimation module 64 performs local spatial motion analysis based on the motion vector fields (212). True motion estimation module 64 generates a spatially-estimated motion vector filed based on the local spatial motion analysis (214).

True motion estimation module 64 performs temporal motion analysis based on the spatially-estimated motion vector fields (216). True motion estimation module 64 generates a temporally-refined motion vector field based on the temporal motion analysis (218).

Figure 15:
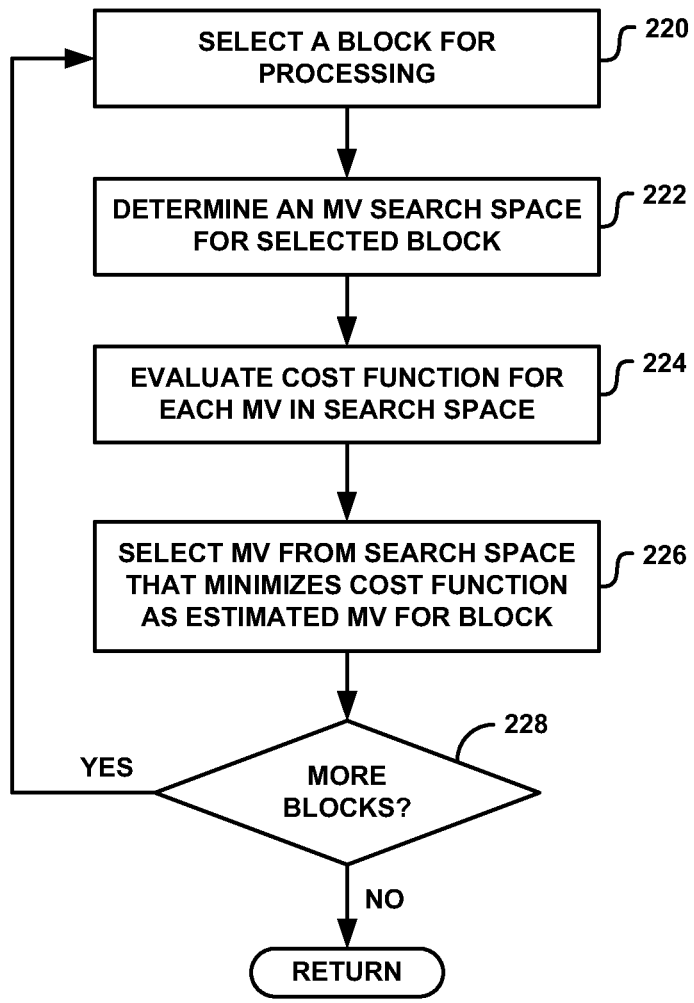
FIG. 15 is a flow diagram illustrating a technique for generating a motion vector field according to this disclosure.

FIG. 15 is a flow diagram illustrating a technique for generating a motion vector field for a plurality of video blocks. In some examples, the plurality of video blocks may be a sequence of video blocks. In additional examples, the plurality of video blocks may be contained within one or more video frames.

True motion estimation module 64 selects a video block for processing (220). True motion estimation module 64 determines a motion vector search space for the selected block (222). True motion estimation module 64 evaluates a cost function for each motion vector within the search space (224). True motion estimation module 64 selects the motion vector from the search space that minimizes the cost function as the estimated motion vector for the block (226). True motion estimation module 64 determines if there are more video blocks within the plurality of blocks (228). If there are more blocks, true motion estimation module 64 returns to block 220 to select another block from the plurality of video blocks for processing. If there no additional blocks within the plurality of video blocks, true motion estimation module 64 ends the motion vector field algorithm, and returns the motion vectors corresponding to the video blocks as a motion vector field.

In some examples, the plurality of video blocks may be a plurality of sub-blocks. In such examples, when the flow diagram in FIG. 15 and the corresponding description describes a block, the block may refer to a sub-block. In this manner, the techniques depicted in FIG. 15 may be used to generate a motion vector field for both a plurality of blocks and a plurality of sub-blocks.

Figure 16:
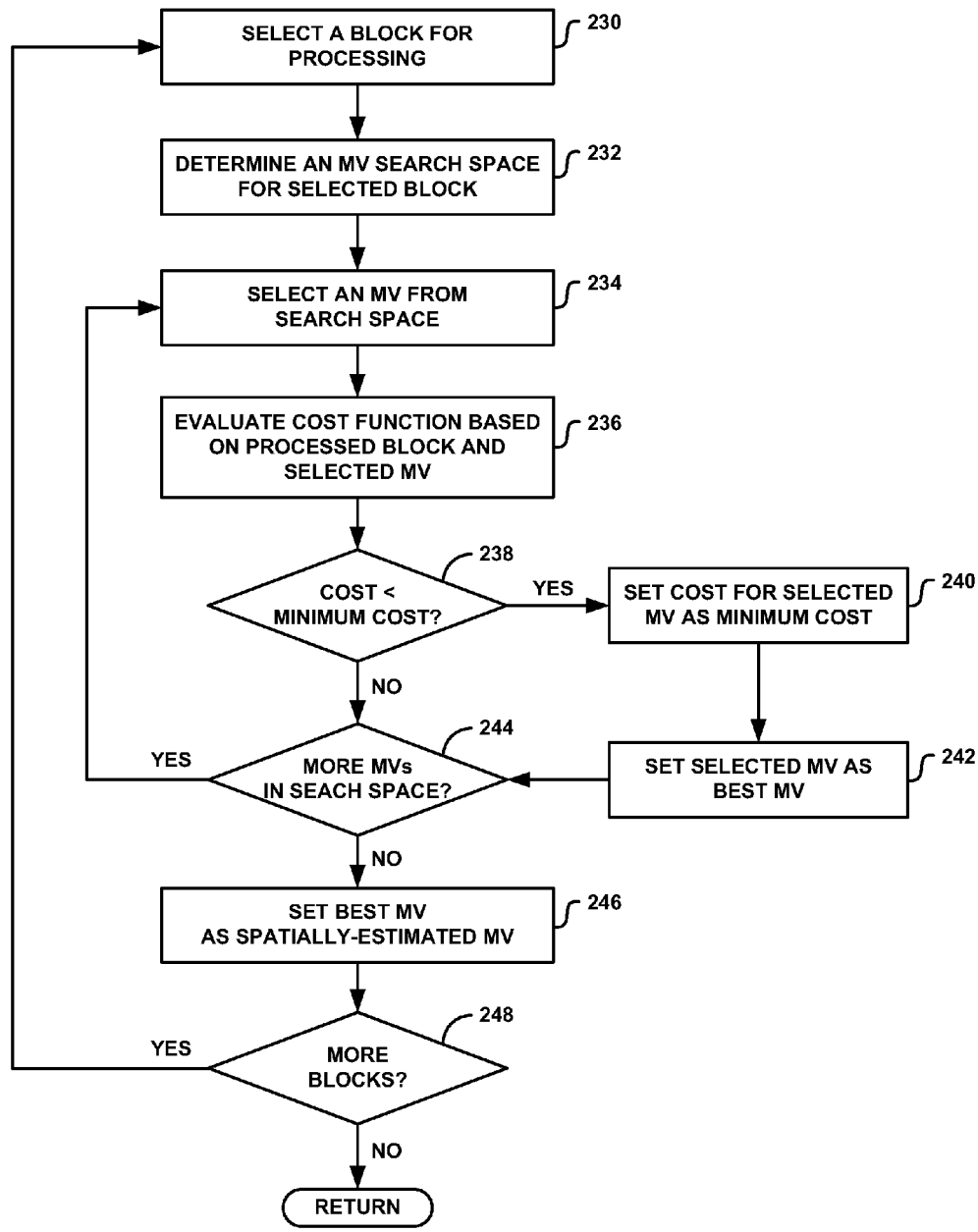
FIG. 16 is a flow diagram illustrating another technique for generating a motion vector field according to this disclosure.

FIG. 16 is a flow diagram illustrating another technique for generating a motion vector field for a plurality of video blocks. The flow diagram depicted in FIG. 16 may be used to implement the flow diagram in FIG. 15. In some examples, the plurality of video blocks may be a sequence of video blocks. In additional examples, the plurality of video blocks may be contained within one or more video frames.

True motion estimation module 64 selects a video block for processing (230). True motion estimation module 64 determines a motion vector search space for the selected block (232). True motion estimation module 64 selects a motion vector from the motion vector search space (234). True motion estimation module 64 evaluates the cost function based on the selected block and the selected motion vector (236). True motion estimation module 64 determines if the result of the evaluated cost function is less than a minimum cost for the selected block (238).

In some examples, true motion estimation module 64 may automatically traverses the "YES" path from decision block 238 if the motion vector is the first motion vector to be selected within the search space. In other examples, the minimum cost function may be initialized to a high value or an infinite value prior to selecting the first motion vector from the search space for the selected block.

If the result of the evaluated cost function is less than a minimum cost for the selected block, true motion estimation module 64 sets or updates the evaluated cost for the selected motion vector as the minimum cost for the selected block (240), sets the selected motion vector as the best motion vector (242), and proceeds to block 244. If the result of the evaluated cost function is not less than a minimum cost for the selected block, true motion estimation module 64 proceeds to block 244.

True motion estimation module 64 determines if there are more motion vectors within the motion vector search space that have not been evaluated (244). If there are more motion vectors within the motion vector search space that have not been evaluated, true motion estimation module 64 returns to block 234 to select another motion vector from the search space. If all of the motion vectors within the motion vector search space have been evaluated, true motion estimation module 64 sets the best motion vector as the estimated motion vector for the video block (246).

True motion estimation module 64 determines if there are more video blocks within the plurality of video blocks to be processed (248). If there are more video blocks within the plurality of video blocks to be processed, true motion estimation module 64 returns to block 230 to select another video block for processing. If all of the video blocks in the plurality of video blocks have been processed, true motion estimation module 64, true motion estimation module 64 ends the motion vector field algorithm, and returns the motion vectors corresponding to the video blocks as a motion vector field.

In some examples, the plurality of video blocks may be a plurality of sub-blocks. In such examples, when the flow diagram in FIG. 16 and the corresponding description describes a block, the block may refer to a sub-block. In this manner, the techniques depicted in FIG. 15 may be used to generate a motion vector field for both a plurality of blocks and a plurality of sub-blocks.

Figure 17:
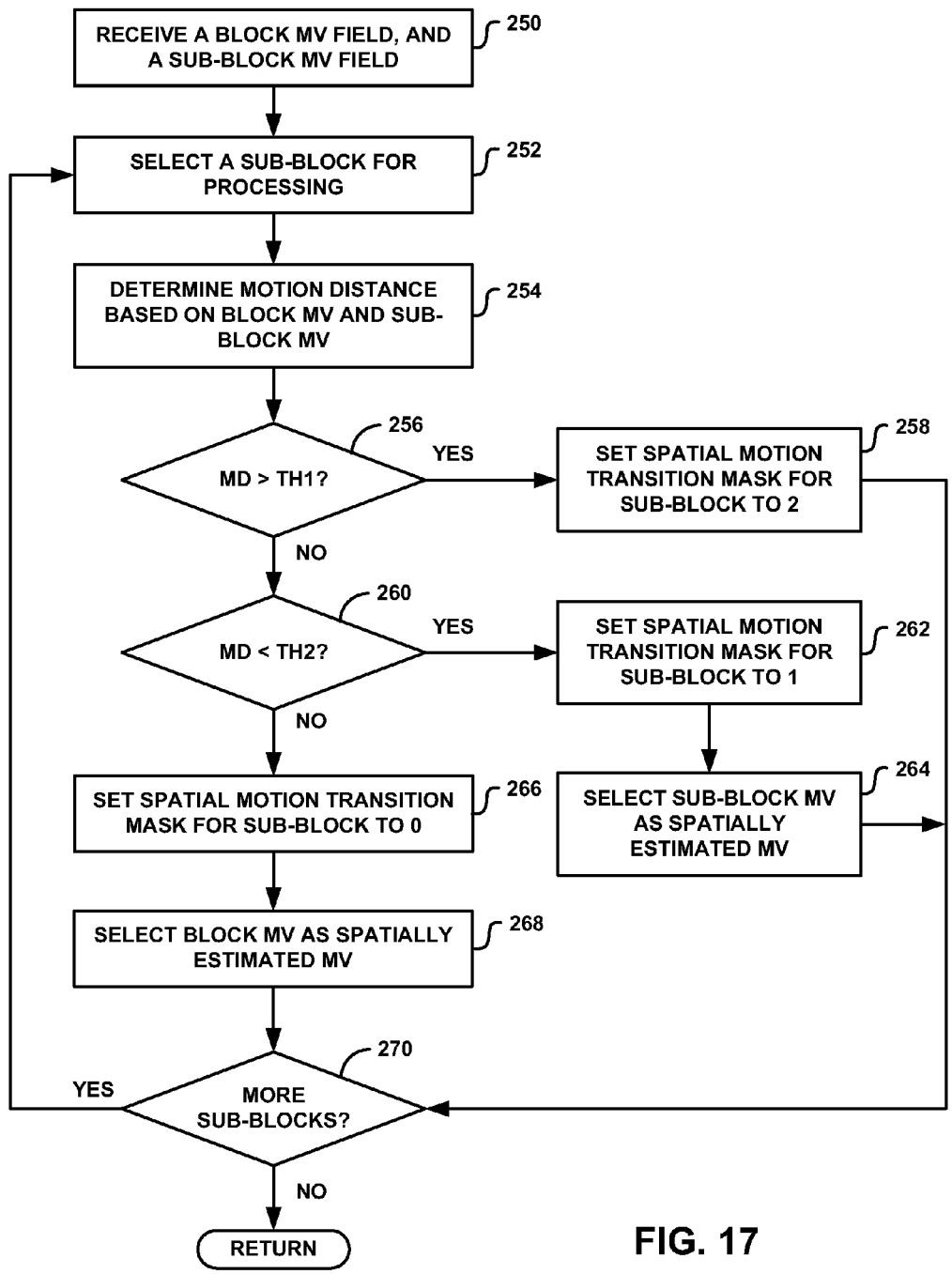
FIG. 17 is a flow diagram illustrating a spatial motion analysis technique according to this disclosure.

FIG. 17 is a flow diagram illustrating a spatial motion analysis technique for generating a spatial motion translation mask for a plurality of video blocks. True motion estimation module 64 receives a set of block motion vectors and a set of sub-block motion vectors (250). The set of block motion vectors may include motion vectors corresponding to one or more video blocks. The set of sub-block motion vectors may include motion vectors corresponding to sub-blocks contained within the one or more video blocks. In some examples, the set of block motion vectors may be referred to as a motion vector field for a plurality of blocks, and the set of sub-block motion vectors may be referred to as a motion vector field for a plurality of sub-blocks.

True motion estimation module 64 selects a block and a sub-block contained within a video block for processing (252). True motion estimation module 64 determines a motion distance between the sub-block motion vector and the block motion vector (254). In some examples, the motion distance may be obtained by determining a Euclidean distance or a Euclidean norm between the two motion vectors.

True motion estimation module 64 determines if the motion distance is a greater than a first threshold (256). If the motion distance is greater than the first threshold, true motion estimation module 64 sets the spatial motion transition mask for the sub-block equal to a value of two (258). If the motion distance is not greater than the first threshold, true motion estimation module 64 determines if the motion distance is less than a second threshold (260). If the motion distance is less than the second threshold, true motion estimation module 64 sets the spatial motion transition mask for the sub-block equal to a value of one (262), and selects the sub-block motion vector as the spatially-estimated motion vector for the sub-block (264). If the motion distance is not less than the second threshold, true motion estimation module 64 sets the spatial motion transition mask for the sub-block equal to a value of zero (266), and selects the block motion vector as the spatially-estimated motion vector for the sub-block (268).

In any case, after selecting the appropriate value for the spatial motion transition mask, true motion estimation module 64 determines if there are more sub-blocks within the set of sub-blocks (270). If there are more sub-blocks within the set of sub-blocks, true motion estimation module 64 returns to block 252 to select sub-block and corresponding block to process. If there are no additional sub-blocks to process, true motion estimation module 64 ends the spatial motion analysis algorithm, and returns the spatial motion transition mask corresponding to the block and sub-block motion vector fields.

Figure 18:
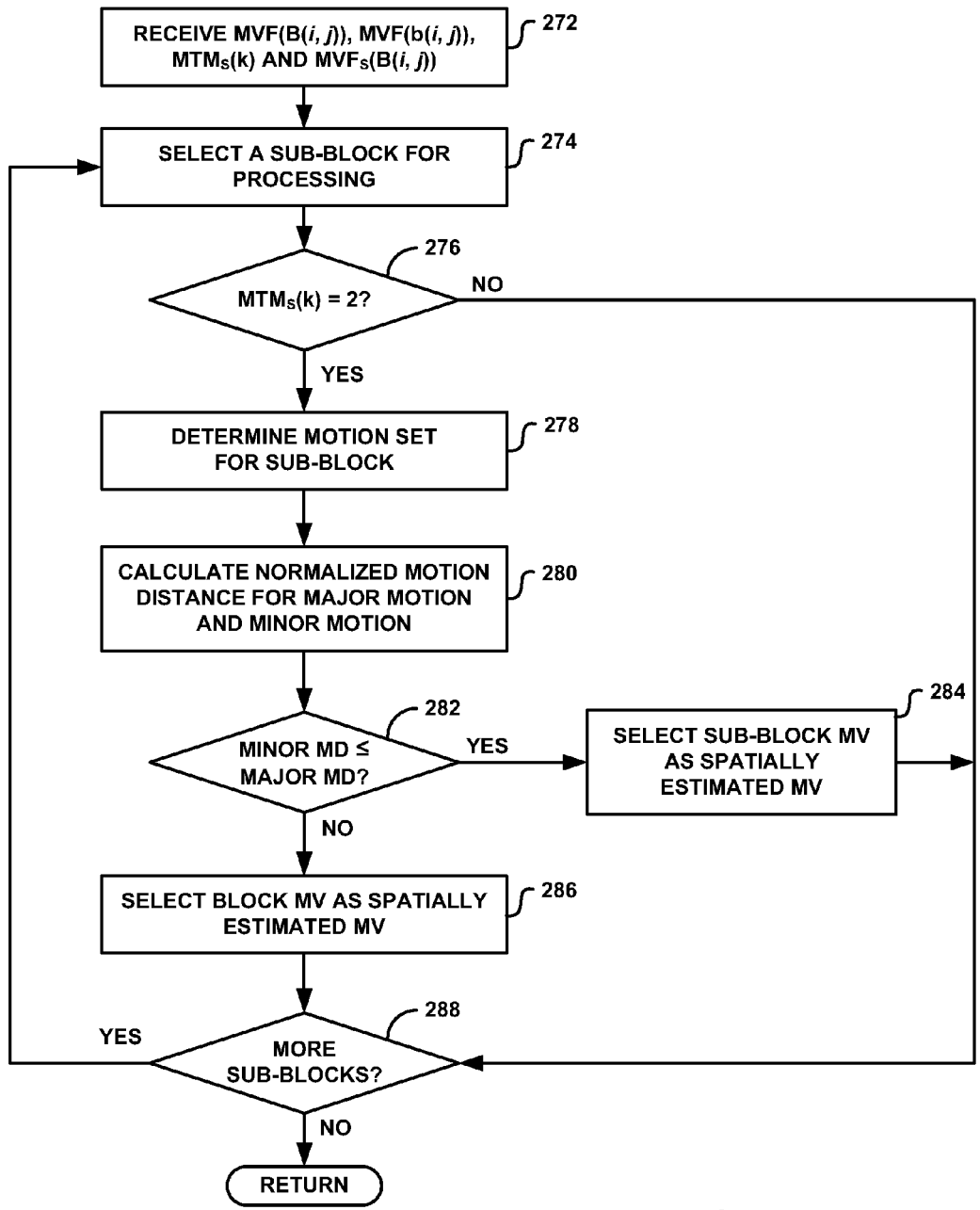
FIG. 18 is a flow diagram illustrating a spatial motion vector processing technique according to this disclosure.

FIG. 18 is a flow diagram illustrating a spatial motion vector processing technique for generating a spatially-estimated motion vector field. True motion estimation module 64 receives a block motion vector field, a sub-block motion vector field, a spatial motion transition mask, and a partially-populated spatially-estimated motion vector field (272). True motion estimation module 64 selects a sub-block for processing (274). True motion estimation module 64 determines if the spatial motion transition mask for the sub-block is equal to a value of two (276). If the spatial motion transition mask is not equal to a value of two, then true motion estimation module 64 proceeds to decision block 288 because true motion selection does not need to be performed for the sub-block. If the spatial motion transition mask is equal to a value of two, then true motion estimation module 64 performs the true motion selection process.

As part of the true motion selection process, true motion estimation module 64 determines a motion set for the sub-block (278). True motion estimation module 64 calculates a normalized motion distance for the major motion and a normalized distance for the minor motion based on the motion set (280). True motion estimation module 64 determines if the normalized motion distance for the minor motion is less than or equal to the normalized motion for the major distance (282). If the normalized motion distance for the minor motion is less than or equal to the normalized motion for the major distance, true motion estimation module 64 selects the motion vector corresponding to the sub-block as the spatially-estimated motion vector for the sub-block (284). Otherwise, if the normalized motion distance for the minor motion is not less than or equal to the normalized motion for the major distance, true motion estimation module 64 selects the motion vector corresponding to the block as the spatially-estimated motion vector for the sub-block (286).

In any case, after selecting the appropriate motion vector for the sub-block, true motion estimation module 64 determines if there are more sub-blocks within the set of sub-blocks (288). If there are more sub-blocks within the set of sub-blocks, true motion estimation module 64 returns to block 270 to select sub-block and corresponding block to process. If there are no additional sub-blocks to process, true motion estimation module 64 ends the spatial motion processing algorithm, and returns the selected motion vectors as a spatially-estimated motion vector field.

Figure 19:
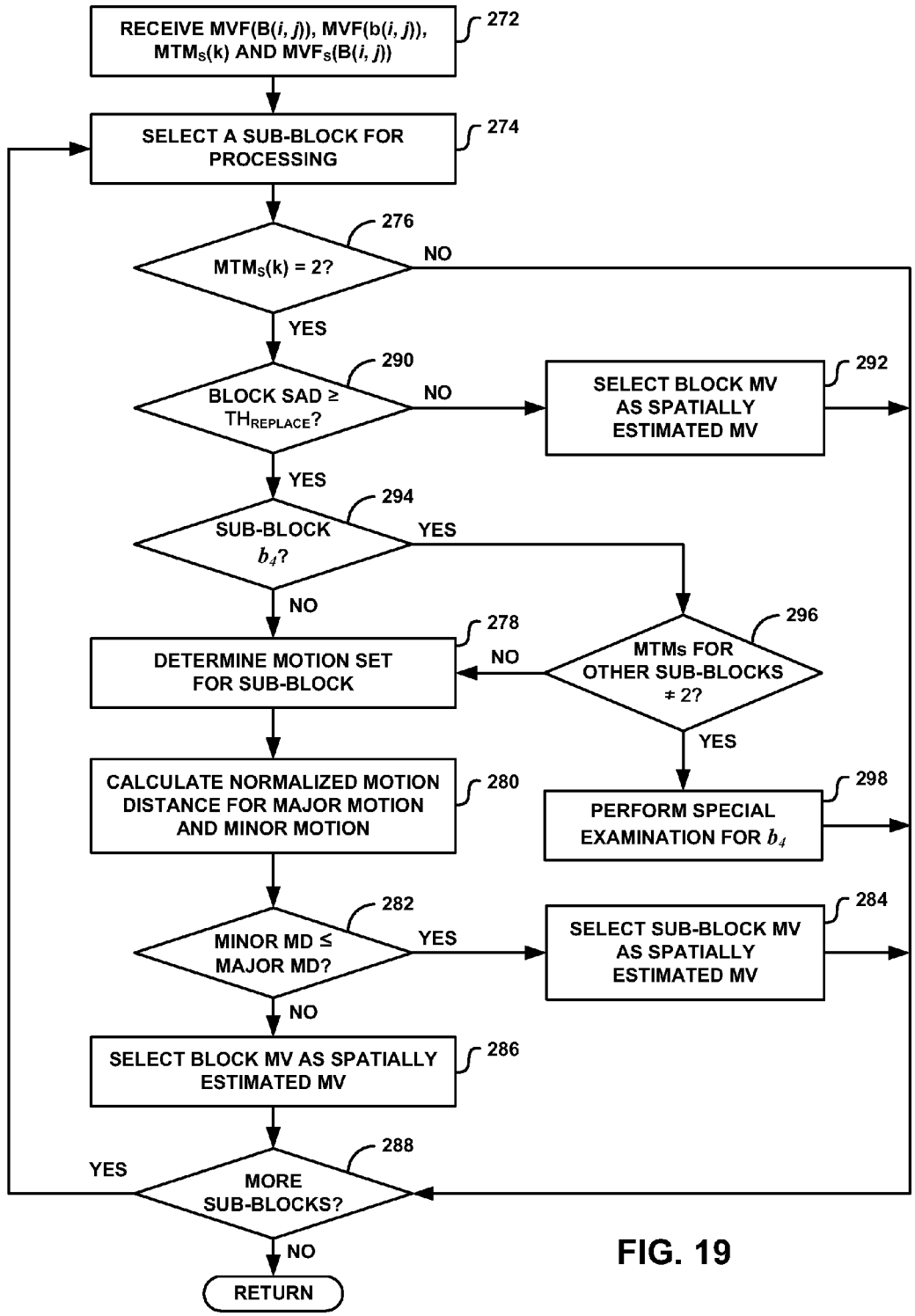
FIG. 19 is a flow diagram illustrating another spatial motion vector processing technique according to this disclosure.

FIG. 19 is a flow diagram illustrating another spatial motion vector processing technique for generating a spatially-estimated motion vector field. The flow diagram shown in FIG. 19 contains some blocks that are similar to blocks contained within the flow diagram shown in FIG. 18. Similar blocks have been given the same reference numerals. According to the technique illustrated in FIG. 19, true motion estimation module 64 determines if the sum of absolute difference for the video block that contains the sub-block is greater than or equal to a replace threshold (290). If the sum of absolute difference for the video block that contains the sub-block is not greater than or equal to a replace threshold, true motion estimation module 64 selects the block motion vector as the spatially-estimated motion vector (292). Otherwise, if the sum of absolute difference for the video block that contains the sub-block is greater than or equal to a replace threshold, true motion estimation module 64 determines if the sub-block selected for processing corresponds to sub-block $b_4$ (294). In some examples, sub-block $B_4$ may be the lower right sub-block within a video block. If the sub-block selected for processing does not correspond to sub-block $b_4$, true motion estimation module 64 proceeds to block 278 to perform the remainder of the algorithm.

If the sub-block selected for processing corresponds to sub-block $b_4$, true motion estimation module 64 determines if any of the motion transition mask values for the other sub-blocks in the video block are equal to a value of two (296). If any of the motion transition mask values for the other sub-blocks in the video block are equal to a value of two, true motion estimation module 64 performs a special motion examination algorithm for sub-block $b_4$ (298), which is described in greater detail with respect to FIG. 20. If any of the motion transition mask values for the other sub-blocks in the video block are equal to a value of two, true motion estimation module 64 proceeds to block 278 to perform the remainder of the algorithm.

Figure 20:
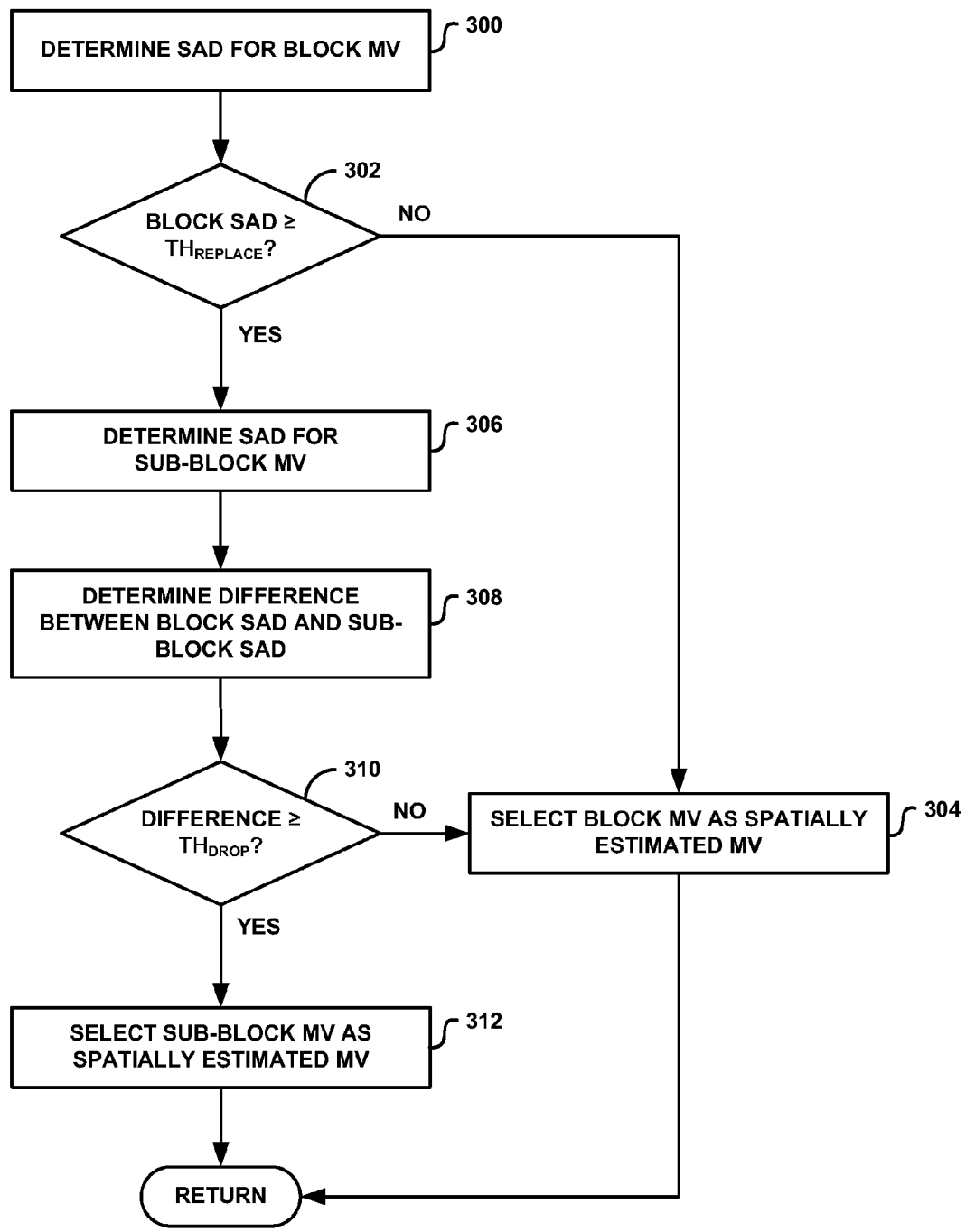
FIG. 20 is a flow diagram illustrating a special motion estimation technique for certain sub-blocks according to this disclosure.

FIG. 20 is a flow diagram illustrating a special motion estimation for sub-block $b_4$. This algorithm, in some examples, may be performed when sub-block $b_4$ is the only sub-block within the corresponding video block to occupy a motion boundary. True motion estimation module 64 determines the sum of absolute difference (SAD) value for the block motion vector (300). The block motion vector may be the motion vector corresponding to the block that includes sub-block $b_4$. True motion estimation module 64 determines if the SAD value for the block motion vector is greater than or equal to a replace threshold (302). In some examples, the replace threshold for the sub-block $b_4$ processing algorithm may be different from the replace threshold shown in FIG. 19. If the SAD for the block motion vector is not greater than or equal to a replace threshold, true motion estimation module 64 selects the block motion vector as the spatially-estimated motion vector for sub-block $b_4$ (304).

Otherwise, if the SAD for the block MV is greater than or equal to a replace threshold, true motion estimation module 64 determines a sum of absolute difference (SAD) value for the sub-block motion vector (306). True motion estimation module 64 determines a difference between the SAD value for the block motion vector and the SAD value for the sub-block motion vector (308). True motion estimation module 64 determines if the difference is greater than or equal to a drop threshold (310). If the difference is greater than or equal to a drop threshold, true motion estimation module 64 selects the sub-block motion vector as the spatially-estimated motion vector (312). If the difference is not greater than or equal to a drop threshold, true motion estimation module 64 selects the block motion vector as the spatially-estimated motion vector (304).

Figure 21:
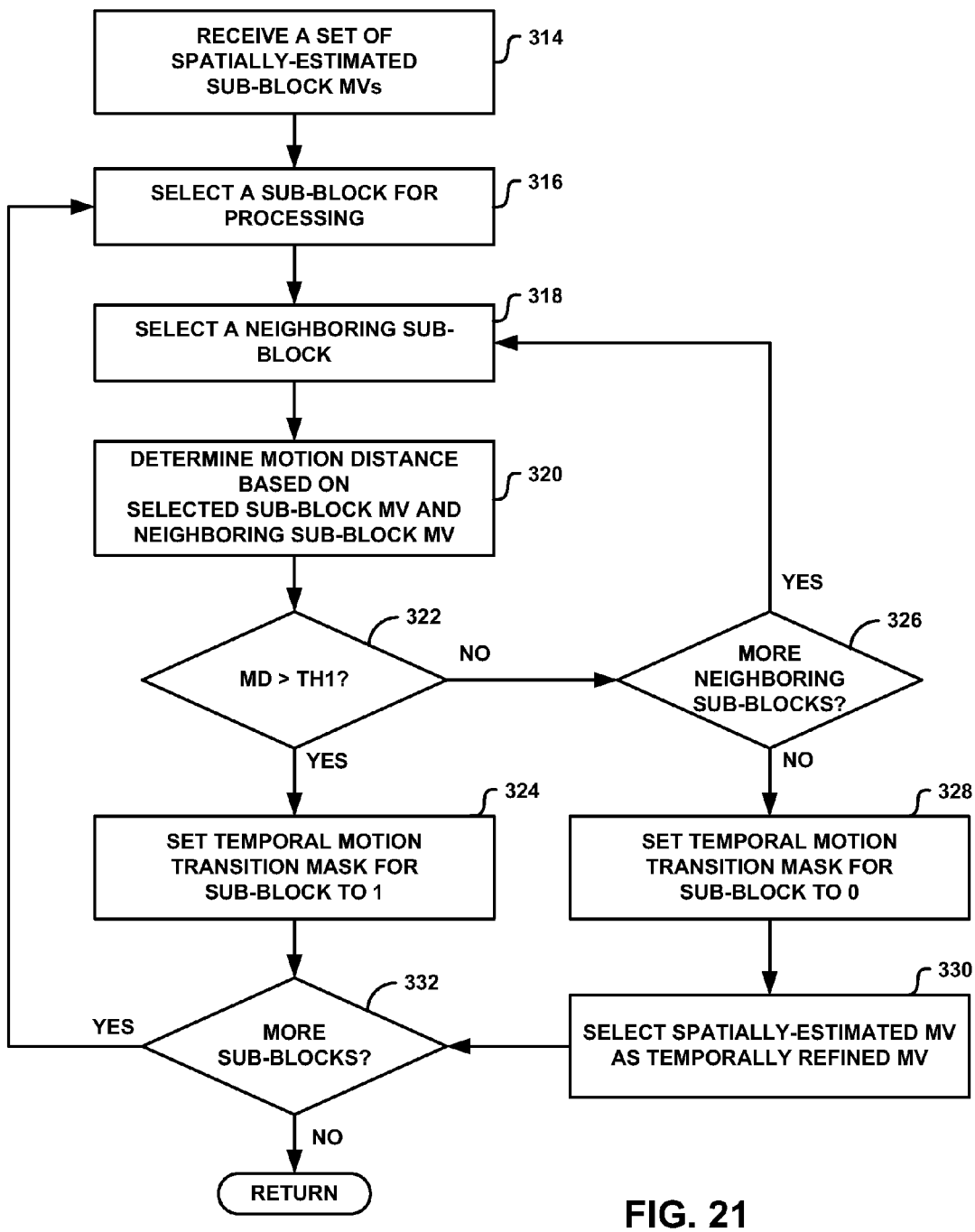
FIG. 21 is a flow diagram illustrating a temporal motion analysis technique according to this disclosure.

FIG. 21 is a flow diagram illustrating a temporal motion analysis technique for generating a temporal motion translation mask for a plurality of video blocks. True motion estimation module 64 receives a set of spatially-estimated sub-block motion vectors (314). True motion estimation module 64 selects a sub-block for processing (316). True motion estimation module 64 determines the motion distance between the processed sub-block motion vector and the neighboring sub-block motion vector (318). True motion estimation module 64 determines if the motion distance is greater than a threshold (320). If the motion distance is greater than the threshold, true motion estimation module 64 sets the temporal motion transition mask for the sub-block equal to a value of one (324). If the motion distance is not greater than the threshold, true motion estimation module 64 determines if there are more neighboring sub-blocks that have not been tested (326). If there are more neighboring sub-blocks that have not been tested, true motion estimation module 64 proceeds to block 318 to select another neighboring sub-block for testing. Otherwise, if all of the neighboring sub-blocks have been tested, true motion estimation module 64 sets the temporal motion transition mask for the sub-block equal to a value of zero (328), and selects the spatially-estimated motion vector to be the temporally-refined motion vector for the sub-block (330).

In any case, after selecting the appropriate value for the temporal motion transition mask, true motion estimation module 64 determines if there are more sub-blocks within the set of sub-blocks (332). If there are more sub-blocks within the set of sub-blocks, true motion estimation module 64 returns to block 316 to select another sub-block and corresponding block to process. If there are no additional sub-blocks to process, true motion estimation module 64 ends the temporal motion analysis algorithm, and returns the temporal motion transition mask corresponding to the spatially-estimated sub-block motion vector field.

Figure 22:
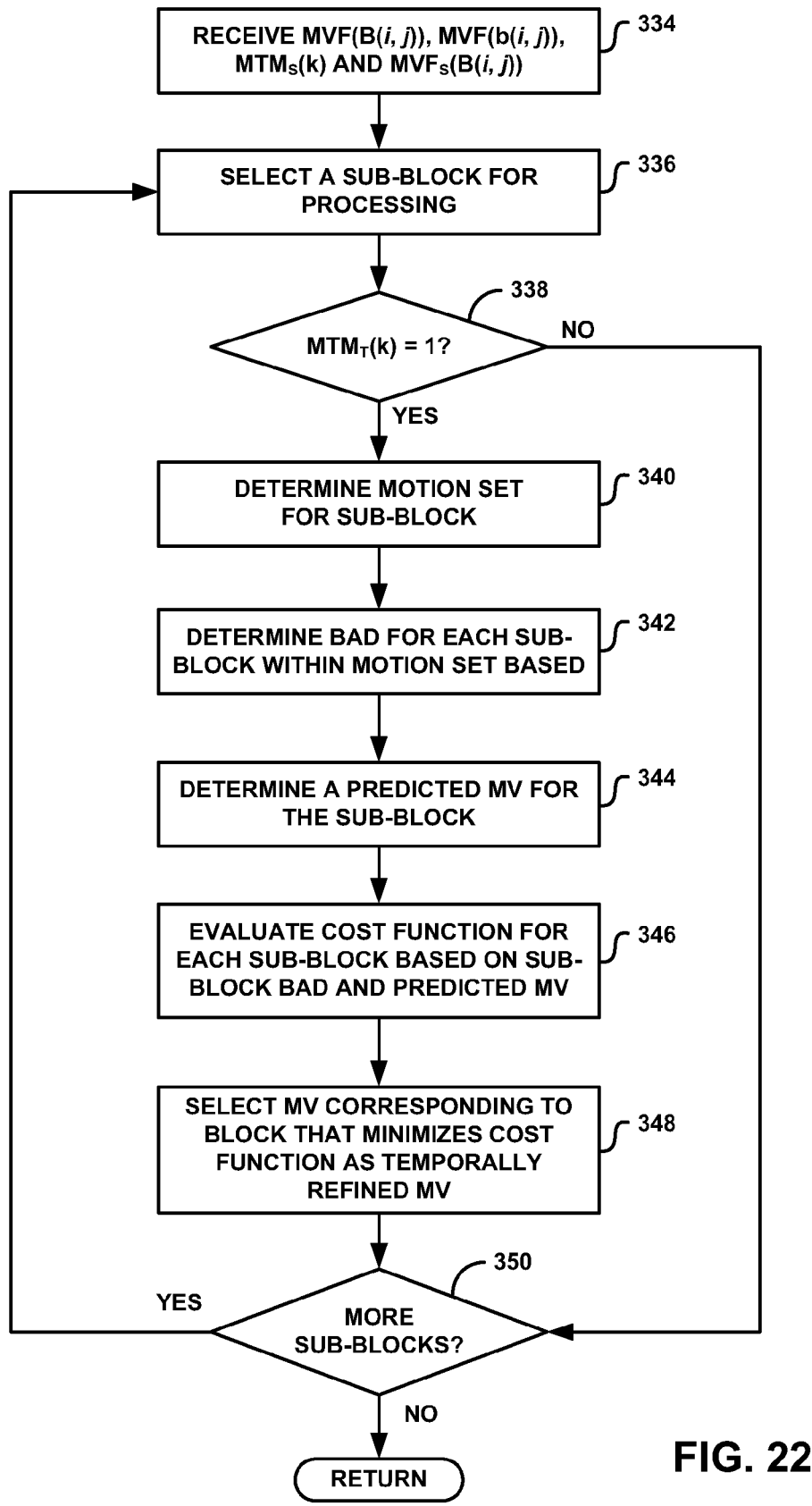
FIG. 22 is a flow diagram illustrating a temporal motion vector refinement technique according to this disclosure.

FIG. 22 is a flow diagram illustrating a temporal motion vector refinement technique for generating a temporally-refined motion vector field. True motion estimation module 64 receives a temporal motion transition mask, and a spatially-estimated sub-block motion vector field (334). True motion estimation module 64 selects a sub-block for processing (336). True motion estimation module 64 determines if the spatial motion transition mask for the sub-block is equal to a value of one (338). If the spatial motion transition mask is not equal to a value of one, then true motion estimation module 64 proceeds to decision block 350 because bidirectional temporal refinement does need to be performed for the sub-block. If the spatial motion transition mask is equal to a value of two, then true motion estimation module 64 performs the bidirectional temporal refinement process.

As part of the bidirectional temporal refinement process, true motion estimation module 64 determines a motion set for the sub-block (340). True motion estimation module 64 determines a bidirectional prediction difference (BPD) for each sub-block within the motion set (342). True motion estimation module 64 determines a predicted motion vector for the sub-block (344). True motion estimation module 64 evaluates a cost function for each sub-block based on the sub-block BAD and the predicted motion vector (346). True motion estimation module 64 selects motion vector corresponding to block that minimizes cost function as temporally-refined motion vector (348).

After selecting the appropriate motion vector for the sub-block, true motion estimation module 64 determines if there are more sub-blocks within the set of sub-blocks (350). If there are more sub-blocks within the set of sub-blocks, true motion estimation module 64 returns to block 336 to select sub-block and corresponding block to process. If there are no additional sub-blocks to process, true motion estimation module 64 ends the spatial motion processing algorithm, and returns the selected motion vectors as a spatially-estimated motion vector field.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of generating motion vectors in a video processing device, the method comprising:
   determining a motion distance between a block motion vector and a sub-block motion vector, wherein the block motion vector corresponds to a video block that includes a sub-block corresponding to the sub-block motion vector;
   comparing the motion distance to a first threshold;
   selecting one of the block motion vector and the sub-block motion vector as a spatially-estimated motion vector for the sub-block based on neighboring motion vectors when the motion distance is greater than the first threshold;
   comparing the motion distance to a second threshold when the motion distance is not greater than the first threshold;
   selecting the block motion vector as the spatially-estimated motion vector for the sub-block when the motion distance is greater than the second threshold; and
   selecting the sub-block motion vector as the spatially-estimated motion vector for the sub-block when the motion distance is not greater than the second threshold.

2. The method of claim 1, further comprising:
   selecting one of the block motion vector and the sub-block motion vector based on the motion distance when the motion distance is not greater than the first threshold.

3. The method of claim 1, further comprising:
   performing motion compensated frame rate up conversion (FRUC) based on the spatially-estimated motion vector.

4. The method of claim 1, further comprising:
   comparing the spatially-estimated motion vector for the sub-block to a spatially-estimated motion vector for a neighboring sub-block; and
   selecting one of the spatially-estimated motion vector for the sub-block and the spatially-estimated motion vector for the neighboring sub-block as a temporally-refined motion vector for the sub-block based on a comparison of the spatially-estimated motion vector for the sub-block to the spatially-estimated motion vector for the neighboring sub-block.

5. The method of claim 4, wherein selecting one of the spatially-estimated motion vector for the sub-block and the spatially-estimated motion vector for the neighboring sub-block comprises:
   selecting a motion vector from a set of motion vectors that minimizes a cost function, wherein the set of motion vectors includes the spatially-estimated motion vector for the sub-block and spatially-estimated motion vectors for neighboring sub-blocks.

6. The method of claim 4, further comprising:
   performing motion compensated frame rate up conversion (FRUC) based on the temporally-refined motion vector.

7. A method comprising:
   comparing a block motion vector to a sub-block motion vector, wherein the block motion vector corresponds to a video block that includes a sub-block corresponding to the sub-block motion vector;
   determining if the sub-block occupies a motion transition area of a video frame based on a comparison of the block motion vector to the sub-block motion vector; and
   selecting one of the block motion vector and the sub-block motion vector as a spatially-estimated motion vector for the sub-block based on neighboring motion vectors when the sub-block occupies the motion transition area of the video frame.

8. The method of claim 7, further comprising:
   selecting one of the block motion vector and the sub-block motion vector based on a motion distance between the block motion vector and the sub-block motion vector when the sub-block does not occupy the motion transition area of the video frame.

9. The method of claim 7, wherein selecting one of the block motion vector and the sub-block motion vector based on the neighboring motion vectors comprises:

determining a first motion distance between the block motion vector and at least one spatially-estimated motion vector corresponding to a first neighboring sub-block;

determining a second motion distance between the sub-block motion vector and at least one spatially-estimated motion vector corresponding to a second neighboring sub-block;

comparing the first motion distance to the second motion distance; and selecting one of the block motion vector and the sub-block motion vector based on a comparison of the first motion distance to the second motion distance.

10. A device for processing video signals, the device comprising:
  a motion estimation module configured to:
    determine a motion distance between a block motion vector and a sub-block motion vector,
    compare the motion distance to a first threshold,
    select one of the block motion vector and the sub-block motion vector as a spatially-estimated motion vector for the sub-block based on neighboring motion vectors when the motion distance is greater than the first threshold,
    compare the motion distance to a second threshold when the motion distance is not greater than the first threshold,
    select the block motion vector as the spatially-estimated motion vector for the sub-block when the motion distance is greater than the second threshold, and
    select the sub-block motion vector as the spatially-estimated motion vector for the sub-block when the motion distance is not greater than the second threshold,
    wherein the block motion vector corresponds to a video block that includes a sub-block corresponding to the sub-block motion vector.

11. The device of claim 10, wherein motion estimation module is further configured to select one of the block motion vector and the sub-block motion vector based on the motion distance when the motion distance is not greater than the first threshold.

12. The device of claim 10, further comprising an interpolation module configured to perform motion compensated frame rate up conversion (FRUC) based on the spatially-estimated motion vector.

13. The device of claim 10, wherein motion estimation module is further configured to compare the spatially-estimated motion vector for the sub-block to a spatially-estimated motion vector for a neighboring sub-block, and select one of the spatially-estimated motion vector for the sub-block and the spatially-estimated motion vector for the neighboring sub-block as a temporally-refined motion vector for the sub-block based on a comparison of the spatially-estimated motion vector for the sub-block to the spatially-estimated motion vector for the neighboring sub-block.

14. The device of claim 13, wherein motion estimation module is further configured to select a motion vector from a set of motion vectors that minimizes a cost function, wherein the set of motion vectors includes the spatially-estimated motion vector for the sub-block and spatially-estimated motion vectors for neighboring sub-blocks.

15. The device of claim 13, further comprising an interpolation module configured to perform motion compensated frame rate up conversion (FRUC) based on the temporally-refined motion vector.

16. The device of claim 10, wherein the device comprises at least one of an integrated circuit, a microprocessor, or a wireless communication device.

17. A device comprising:
  a motion estimation module configured to compare a block motion vector to a sub-block motion vector, determine if the sub-block occupies a motion transition area of a video frame based on a comparison of the block motion vector to the sub-block motion vector, and select one of the block motion vector and the sub-block motion vector as a spatially-estimated motion vector for the sub-block based on neighboring motion vectors when the sub-block occupies the motion transition area of the video frame.

18. The device of claim 17, wherein motion estimation module is further configured to select one of the block motion vector and the sub-block motion vector based on a motion distance between the block motion vector and the sub-block motion vector when the sub-block does not occupy the motion transition area of the video frame.

19. The device of claim 17, wherein motion estimation module is further configured to determine a first motion distance between the block motion vector and at least one spatially-estimated motion vector corresponding to a first neighboring sub-block, determine a second motion distance between the sub-block motion vector and at least one spatially-estimated motion vector corresponding to a second neighboring sub-block, compare the first motion distance to the second motion distance, and select one of the block motion vector and the sub-block motion vector based on a comparison of the first motion distance to the second motion distance.

20. An apparatus for processing video signals, the apparatus comprising:
  means for determining a motion distance between a block motion vector and a sub-block motion vector, wherein the block motion vector corresponds to a video block that includes a sub-block corresponding to the sub-block motion vector;
  means for comparing the motion distance to a first threshold;
  means for selecting one of the block motion vector and the sub-block motion vector as a spatially-estimated motion vector for the sub-block based on neighboring motion vectors when the motion distance is greater than the first threshold;
  means for comparing the motion distance to a second threshold when the motion distance is not greater than the first threshold;
  means for selecting the block motion vector as the spatially-estimated motion vector for the sub-block when the motion distance is greater than the second threshold; and
  means for selecting the sub-block motion vector as the spatially-estimated motion vector for the sub-block when the motion distance is not greater than the second threshold.

21. The apparatus of claim 20, further comprising:
  means for selecting one of the block motion vector and the sub-block motion vector based on the motion distance when the motion distance is not greater than the first threshold.

22. The apparatus of claim 20, further comprising:
  means for performing motion compensated frame rate up conversion (FRUC) based on the spatially-estimated motion vector.

23. The apparatus of claim 20, further comprising:
means for comparing the spatially-estimated motion vector for the sub-block to a spatially-estimated motion vector for a neighboring sub-block; and
means for selecting one of the spatially-estimated motion vector for the sub-block and the spatially-estimated motion vector for the neighboring sub-block as a temporally-refined motion vector for the sub-block based on a comparison of the spatially-estimated motion vector for the sub-block to the spatially-estimated motion vector for the neighboring sub-block.

24. The apparatus of claim 23, wherein the means for selecting one of the spatially-estimated motion vector for the sub-block and the spatially-estimated motion vector for the neighboring sub-block comprises:
means for selecting a motion vector from a set of motion vectors that minimizes a cost function, wherein the set of motion vectors includes the spatially-estimated motion vector for the sub-block and spatially-estimated motion vectors for neighboring sub-blocks.

25. The apparatus of claim 23, further comprising:
means for performing motion compensated frame rate up conversion (FRUC) based on the temporally-refined motion vector.

26. The apparatus of claim 20, wherein the apparatus comprises at least one of an integrated circuit, a microprocessor, or a wireless communication device.

27. An apparatus comprising:
means for comparing a block motion vector to a sub-block motion vector, wherein the block motion vector corresponds to a video block that includes a sub-block corresponding to the sub-block motion vector;
means for determining if the sub-block occupies a motion transition area of a video frame based on a comparison of the block motion vector to the sub-block motion vector; and
means for selecting one of the block motion vector and the sub-block motion vector based on neighboring motion vectors when the sub-block occupies the motion transition area of the video frame.

28. The apparatus of claim 27, further comprising:
means for selecting one of the block motion vector and the sub-block motion vector based on a motion distance between the block motion vector and the sub-block motion vector when the sub-block does not occupy the motion transition area of the video frame.

29. The apparatus of claim 28, wherein the means for selecting one of the block motion vector and the sub-block motion vector based on the neighboring motion vectors comprises:
means for determining a first motion distance between the block motion vector and at least one spatially-estimated motion vector corresponding to a first neighboring sub-block;
means for determining a second motion distance between the sub-block motion vector and at least one spatially-estimated motion vector corresponding to a second neighboring sub-block;
means for comparing the first motion distance to the second motion distance; and
means for selecting one of the block motion vector and the sub-block motion vector based on a comparison of the first motion distance to the second motion distance.

30. A non-transitory computer-readable storage medium storing computer-executable instructions that upon execution by one or more processors cause the one or more processors to:
determine a motion distance between a block motion vector and a sub-block motion vector, wherein the block motion vector corresponds to a video block that includes a sub-block corresponding to the sub-block motion vector;
compare the motion distance to a first threshold;
select one of the block motion vector and the sub-block motion vector as a spatially-estimated motion vector for the sub-block based on neighboring motion vectors when the motion distance is greater than the first threshold;
compare the motion distance to a second threshold when the motion distance is not greater than the first threshold;
select the block motion vector as the spatially-estimated motion vector for the sub-block when the motion distance is greater than the second threshold; and
select the sub-block motion vector as the spatially-estimated motion vector for the sub-block when the motion distance is not greater than the second threshold.

31. The non-transitory computer-readable storage medium of claim 30, wherein the instructions further cause the one or more processors to:
select one of the block motion vector and the sub-block motion vector based on the motion distance when the motion distance is not greater than the first threshold.

32. The non-transitory computer-readable storage medium of claim 30, wherein the instructions further cause the one or more processors to:
perform motion compensated frame rate up conversion (FRUC) based on the spatially-estimated motion vector.

33. The non-transitory computer-readable storage medium of claim 30, wherein the instructions further cause the one or more processors to:
compare the spatially-estimated motion vector for the sub-block to a spatially-estimated motion vector for a neighboring sub-block; and
select one of the spatially-estimated motion vector for the sub-block and the spatially-estimated motion vector for the neighboring sub-block as a temporally-refined motion vector for the sub-block based on a comparison of the spatially-estimated motion vector for the sub-block to the spatially-estimated motion vector for the neighboring sub-block.

34. The non-transitory computer-readable storage medium of claim 33, wherein the instructions that upon execution by the one or more processors cause the one or more processors to select one of the spatially-estimated motion vector for the sub-block and the spatially-estimated motion vector for the neighboring sub-block comprise instructions that upon execution by the one or more processors cause the one or more processors to:
select a motion vector from a set of motion vectors that minimizes a cost function, wherein the set of motion vectors includes the spatially-estimated motion vector for the sub-block and spatially-estimated motion vectors for neighboring sub-blocks.

35. The non-transitory computer-readable storage medium of claim 33, wherein the instructions further cause the one or more processors to:
perform motion compensated frame rate up conversion (FRUC) based on the temporally-refined motion vector.

36. A non-transitory computer-readable storage medium storing computer-executable instructions that upon execution by one or more processors cause the one or more processors to:
compare a block motion vector to a sub-block motion vector, wherein the block motion vector corresponds to a video block that includes a sub-block corresponding to the sub-block motion vector;

determine if the sub-block occupies a motion transition area of a video frame based on a comparison of the block motion vector to the sub-block motion vector; and select one of the block motion vector and the sub-block motion vector based on neighboring motion vectors when the sub-block occupies the motion transition area of the video frame.

37. The non-transitory computer-readable storage medium of claim 36, wherein the instructions further cause the one or more processors to:

select one of the block motion vector and the sub-block motion vector based on a motion distance between the block motion vector and the sub-block motion vector when the sub-block does not occupy the motion transition area of the video frame.

38. The non-transitory computer-readable storage medium of claim 36, wherein the instructions that upon execution by the one or more processors cause the one or more processors to select one of the block motion vector and the sub-block motion vector based on the neighboring motion vectors comprise instructions that upon execution by the one or more processors cause the one or more processors to:

determine a first motion distance between the block motion vector and at least one spatially-estimated motion vector corresponding to a first neighboring sub-block;

determine a second motion distance between the sub-block motion vector and at least one spatially-estimated motion vector corresponding to a second neighboring sub-block;

compare the first motion distance to the second motion distance; and select one of the block motion vector and the sub-block motion vector based on a comparison of the first motion distance to the second motion distance.

* * * * *